United States Patent
Kajiwara et al.

(10) Patent No.: US 11,774,885 B2
(45) Date of Patent: Oct. 3, 2023

(54) POLYMER MATERIAL MOLDED PRODUCT, FIXING MEMBER, METHOD FOR PRODUCING FIXING MEMBER, FIXING DEVICE, AND IMAGE FORMING APPARATUS

(71) Applicant: FUJIFILM Business Innovation Corp., Tokyo (JP)

(72) Inventors: Kenji Kajiwara, Kanagawa (JP); Tomotake Inagaki, Kanagawa (JP); Ryohei Yoshikawa, Kanagawa (JP); Kenji Omori, Kanagawa (JP); Ryosuke Kubota, Kanagawa (JP); Jun Kimura, Kanagawa (JP); Hideaki Ohara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/722,394

(22) Filed: Apr. 18, 2022

(65) Prior Publication Data
US 2023/0119004 A1 Apr. 20, 2023

(30) Foreign Application Priority Data
Oct. 14, 2021 (JP) ................. 2021-169057

(51) Int. Cl.
 *G03G 15/20* (2006.01)
 *C08L 83/06* (2006.01)
 (Continued)

(52) U.S. Cl.
 CPC .......... *G03G 15/20* (2013.01); *C01B 32/158* (2017.08); *C01B 32/182* (2017.08); *C08L 83/06* (2013.01);
 (Continued)

(58) Field of Classification Search
 CPC ............ G03G 15/20; G03G 2215/2048; C01B 32/158; C01B 32/182; C01B 2202/24;
 (Continued)

(56) References Cited

U.S. PATENT DOCUMENTS

2011/0305488 A1* 12/2011 Kikuno ................ G03G 15/161
 399/312
2015/0198915 A1* 7/2015 Wu ....................... G03G 15/206
 252/500
(Continued)

FOREIGN PATENT DOCUMENTS

JP H0640448 5/1994
JP 2015164889 A * 9/2015
(Continued)

OTHER PUBLICATIONS

Yoshioka et al., JP-2020140950-A Publication and English Translation (Year: 2020).*

*Primary Examiner* — Ryan D Walsh
(74) *Attorney, Agent, or Firm* — JCIPRNET

(57) ABSTRACT

A polymer material molded product includes a polymer material and a porous carbon material having an X-ray diffraction spectral characteristic shown in the following (1) or (2),
 (1): a peak derived from a (002) plane of carbon is observed, a half width of the peak derived from the (002) plane of carbon is 5° or more, and a half width of a peak derived from a (10) plane of carbon is 3.2° or less, and
 (2): the peak derived from the (002) plane of carbon is not observed, and the half width of the peak derived from the (10) plane of carbon is 3.2° or less.

22 Claims, 4 Drawing Sheets

(51) Int. Cl.
  *C01B 32/182* (2017.01)
  *C01B 32/158* (2017.01)
  *B82Y 30/00* (2011.01)
(52) U.S. Cl.
  CPC ........... *B82Y 30/00* (2013.01); *C01B 2202/24* (2013.01); *C01B 2204/24* (2013.01); *C01B 2204/32* (2013.01); *G03G 2215/2048* (2013.01)
(58) Field of Classification Search
  CPC . C01B 2204/24; C01B 2204/32; C08L 83/06; B82Y 30/00
  See application file for complete search history.

(56) References Cited

U.S. PATENT DOCUMENTS

2021/0373473 A1* 12/2021 Lee .................. B32B 27/34
2022/0382196 A1* 12/2022 Yoshikawa ........ G03G 15/2057
2022/0382197 A1* 12/2022 Yoshikawa ........ G03G 15/2064

FOREIGN PATENT DOCUMENTS

| JP | 2020140950 | | 9/2020 | |
|---|---|---|---|---|
| KR | 20130107991 A | * | 10/2013 | |
| WO | WO-2011052063 A1 | * | 5/2011 | ............. G03G 15/16 |

* cited by examiner

POLYMER MATERIAL MOLDED PRODUCT, FIXING MEMBER, METHOD FOR PRODUCING FIXING MEMBER, FIXING DEVICE, AND IMAGE FORMING APPARATUS

CROSS-REFERENCE TO RELATED APPLICATIONS

This application is based on and claims priority under 35 USC 119 from Japanese Patent Application No. 2021-169057 filed Oct. 14, 2021.

BACKGROUND

(i) Technical Field

The present invention relates to a polymer material molded product, a fixing member, a method for manufacturing a fixing member, a fixing device, and an image forming apparatus.

(ii) Related Art

In the related art, a carbon material such as carbon black is blended in a polymer material molded product used for an elastic layer of a fixing member, an artificial muscle, a pressure sensor, a tactile sensor, or the like, in order to impart thermal conduction property.

However, as a carbon material used as a carrier of an electrode catalyst for a fuel cell, JP2014-186672A and JP2020-140950A proposes "a porous carbon material in which, in an X-ray diffraction spectrum, a peak derived from a (002) plane of carbon is not observed or a half width of the peak derived from the plane (002) of carbon is 5° or more and a half width of a peak derived from a (10) plane of carbon is 3.2° or less.

SUMMARY

Aspects of non-limiting embodiments of the present disclosure relates to a polymer material molded product, a fixing member, a method for manufacturing a fixing member, a fixing device, and an image forming apparatus that the polymer material molded product having a higher thermal conduction property and higher flexibility, comparing to a polymer material molded product including a polymer material and only carbon black as a carbon material.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means that addresses the above advantages includes the following aspect.

According to an aspect of the present disclosure, there is provided a polymer material molded product including a polymer material and a porous carbon material having an X-ray diffraction spectral characteristic shown in the following (1) or (2).

(1): A peak derived from a (002) plane of carbon is observed, a half width of the peak derived from the (002) plane of carbon is 5° or more, and a half width of a peak derived from a (10) plane of carbon is 3.2° or less.

(2): The peak derived from the (002) plane of carbon is not observed, and the half width of the peak derived from the (10) plane of carbon is 3.2° or less.

BRIEF DESCRIPTION OF THE DRAWINGS

Exemplary embodiment(s) of the present invention will be described in detail based on the following figures, wherein.

DETAILED DESCRIPTION

Figure 1:
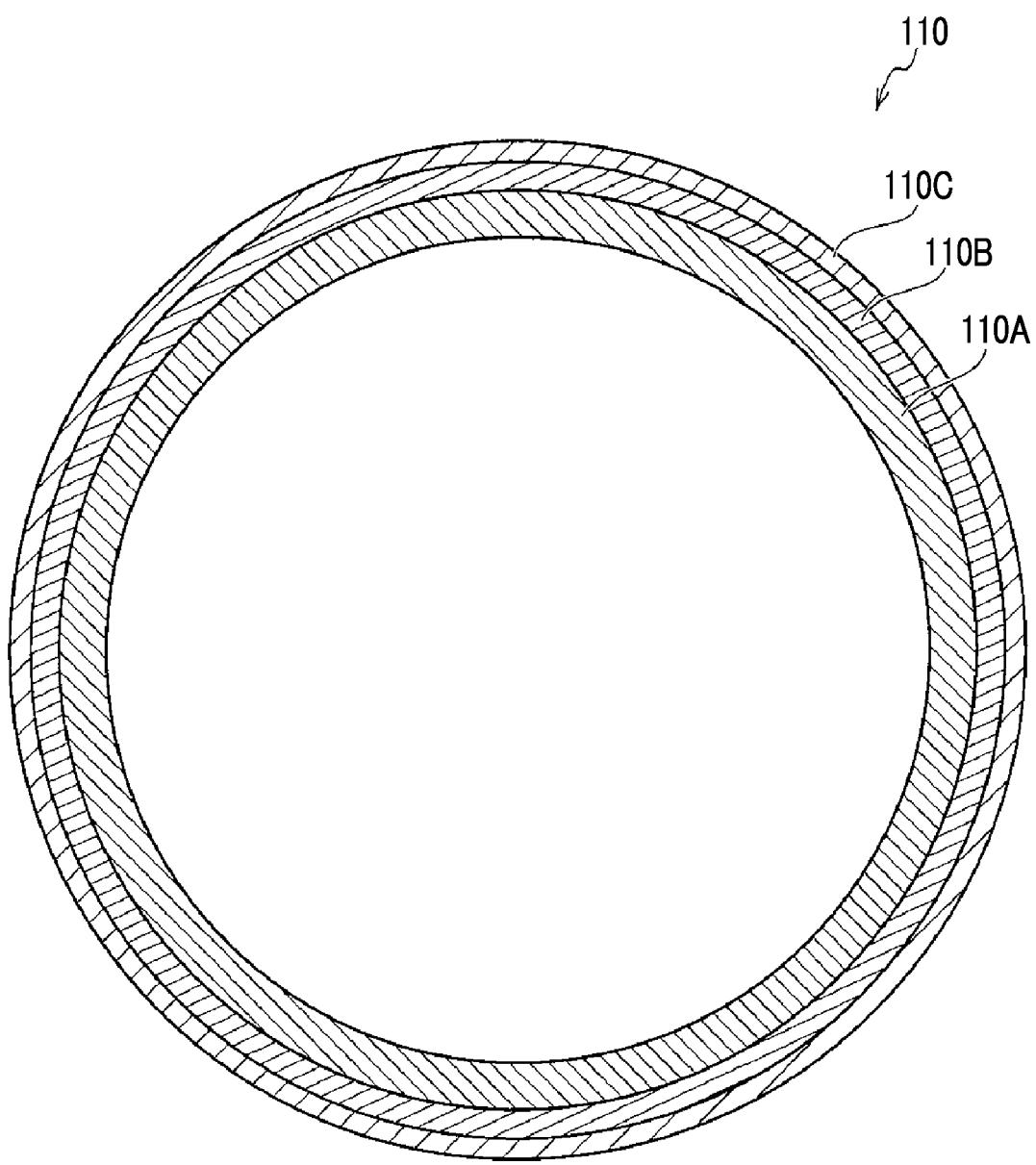
FIG. 1 is a schematic cross sectional diagram showing an example of a fixing member according to the present exemplary embodiment.

Hereinafter, exemplary embodiments which are examples of the present disclosure will be described. These descriptions and examples illustrate the present disclosure and do not limit the scope of the present disclosure.

In a numerical range described stepwise in the present specification, an upper limit value or a lower limit value described in one numerical range may be replaced with an upper limit value or a lower limit value of another numerical range described stepwise. Further, in a numerical range described in the present specification, an upper limit value or a lower limit value of the numerical range may be replaced with a value shown in examples.

In the present specification, the term "step" includes an independent step, and also even in a case where the step cannot be clearly distinguished from other steps, the case is included in the term "step" as long as an intended purpose of the step is achieved.

In a case where the exemplary embodiments are described in the present specification with reference to the drawings, the configurations of the exemplary embodiments are not limited to the configurations shown in the drawings. In addition, the size of members in each figure is conceptual, and a relative relationship between the sizes of the members is not limited thereto. In addition, members having substantially the same function may be given the same sign throughout the all drawings, and duplicate descriptions may be omitted as appropriate.

In the present specification, each component may contain plural kinds of substances corresponding thereto. In a case where the amount of each component in a composition is mentioned in the present disclosure and plural kinds of substances corresponding to each component are present in the composition, unless otherwise specified, the amount means a total amount of the plural kinds of substances present in the composition.

In the present specification, a "polymer material molded product" is also simply referred to as a "molded product".

In the present specification, measurement of a physical property of a porous carbon material is carried out on a porous carbon material collected by immersing a molded product in concentrated sulfuric acid and decomposing a polymer material.

Polymer Material Molded Product

First Exemplary Embodiment

A polymer material molded product according to a first exemplary embodiment includes a polymer material and a porous carbon material having an X-ray diffraction spectral characteristic shown in (1) or (2) which will be described later.

Hereinafter, the porous carbon material having the X-ray diffraction spectral characteristic shown in (1) or (2) which will be described later is also referred to as a "graphene mesosponge (GMS)".

The molded product according to the first exemplary embodiment has a high thermal conduction property and high flexibility due to the configuration. The reason is presumed as follows.

In the related art, a carbon material such as carbon black is blended in a polymer material molded product used for an elastic layer of a fixing member, an artificial muscle, a pressure sensor, a tactile sensor, or the like, in order to impart a thermal conduction property.

However, in a case where a content of the carbon material is increased in order to increase the thermal conduction property of the molded product, flexibility is reduced.

Therefore, in the molded product according to the first exemplary embodiment, the graphene mesosponge is applied as the carbon material. Since graphene mesosponge is formed of a porous carbon material having a high specific surface area, the graphene mesosponge has high elasticity as well as thermal conductivity.

Therefore, it is presumed that the polymer material molded product in which the graphene mesosponge is blended with the polymer material is imparted with a high thermal conduction property and high flexibility.

It is presumed that since the graphene mesosponge has a physical property of high electron conductivity, the polymer material molded product is imparted with high conductivity as well as the high thermal conduction property and the high flexibility.

Second Exemplary Embodiment

A polymer material molded product according to a second exemplary embodiment includes a polymer material and a carbon material, in which a thermal conductivity of the polymer material molded product is 1.5 W/mK or more, and a Young's modulus of the polymer material molded product is 1.0 MPa or less.

Although the polymer material molded product according to the second exemplary embodiment contains a carbon material, the polymer material molded product has a higher thermal conductivity and a lower Young's modulus comparing to a polymer material molded product of the related art.

Therefore, the molded product according to the second exemplary embodiment has a high thermal conduction property and high flexibility.

Hereinafter, details of the molded product (hereinafter referred to as a molded product according to the present exemplary embodiment) corresponding to both the molded product according to the first exemplary embodiment and the second exemplary embodiment will be described. However, the present disclosure may relate to a molded product corresponding to one molded product according to the first exemplary embodiment or the second exemplary embodiment.

Polymer Material

The polymer material is the most abundant component in the molded product as a major component.

The polymer material is selected according to a use of the molded product. Specific examples of the polymer material include a resin material and an elastic material.

Examples of the resin material include a polyimide resin, a polyamide resin, a polyamideimide resin, a polyether etherester resin, a polyphenylene sulfide resin, a polyarylate resin, a polyether etherketone resin, and a polybenzoimidazole polyester resin.

Examples of the elastic material include various rubber materials such as an isoprene rubber, a chloroprene rubber, an epichlorohydrin rubber, a butyl rubber, a polyurethane rubber, a silicone rubber, a fluororubber, a styrene-butadiene rubber, a butadiene rubber, a nitrile rubber, an ethylene propylene rubber, an ethylene-propylene-diene ternary polymerized rubber (EPDM), an acrylonitrile-butadiene copolymer rubber (NBR), a natural rubber, and a blended rubbers thereof.

Among these, in a case where the molded product is required to have the thermal conduction property and the flexibility as well as the heat resistance, for example, the silicone rubber is preferable as the polymer material.

Examples of the silicone rubber include an RTV silicone rubber, an HTV silicone rubber, and a liquid silicone rubber. Specific examples thereof include a polydimethyl silicone rubber (MQ), a methyl vinyl silicone rubber (VMQ), a methylphenyl silicone rubber (PMQ), and a fluorosilicone rubber (FVMQ).

In a case where the molded product is applied to an artificial muscle, a pressure sensor, a tactile sensor, or the like, examples of the polymer material also include a conductive polymer material having a polythiophene skeleton, a polyaniline skeleton, a polypyrrole skeleton, a polyacetylene skeleton, and the like.

Graphene Mesosponge

The graphene mesosponge is a porous carbon material having mesopores. In the International Union of Pure and Applied Chemistry (IUPAC), pores with a diameter of 2 nm or less are defined as micropores, pores with a diameter of 2 nm or more and 50 nm or less are defined as mesopores, and pores with a diameter of 50 nm or more are defined as macropores. Moreover, materials having mesopores are collectively referred to as mesoporous materials.

X-Ray Diffraction Spectral Characteristic

The graphene mesosponge is a porous carbon material having an X-ray diffraction spectral characteristic shown in the following (1) or (2).

(1): A peak derived from a (002) plane of carbon is observed, a half width of the peak derived from the (002) plane of carbon is 5° or more, and a half width of a peak derived from a (10) plane of carbon is 3.2° or less.

(2): The peak derived from the (002) plane of carbon is not observed, and the half width of the peak derived from the (10) plane of carbon is 3.2° or less.

A basic skeleton of the graphene mesosponge is a graphene. In the X-ray diffraction spectrum, the porous carbon material having a configuration in which the half width of the peak derived from the (002) plane of carbon and the half width of the peak derived from the (10) plane of carbon are controlled to be predetermined values has a large size for one graphene and the small number of lamination. Accordingly, the graphene mesosponge has the high elasticity as well as the thermal conduction property, and also has the high conductivity.

Here, in order to obtain the size of a crystallite from a line width of a powder X-ray diffraction peak, the Scherrer's formula shown by the following equation is used.

$$L = K\lambda/\beta \cos\theta \qquad \text{Equation:}$$

In the equation, L represents the size of the crystallite, K represents a form factor (constant), $\lambda$ represents a wavelength of the X-ray, $\beta$ represents a half width of the X-ray diffraction peak, and $\theta$ represents a Bragg angle (½ of the diffraction angle $2\theta$).

In a case of comparing the X-ray diffraction peaks, $\theta$ is a substantially constant value and K and $\lambda$ are constants, so that the crystallite size L is inversely proportional to the size of the half width $\beta$.

Therefore, it can be said that the larger the half width (hereinafter, referred to as "W (002)") of the peak of the (002) plane of carbon derived from a laminated structure of the graphene, the smaller the crystallite size of the crystallites in a lamination direction and the smaller the number of lamination of the graphene. Furthermore, in a case where the porous carbon material is formed of a single layer of graphene without lamination, a diffraction peak derived from the carbon (002) plane does not appear. In addition, even in a case where an abundance ratio of the laminated structure is smaller relative to the graphene of the single layer, it is considered that the diffraction peak derived from the carbon (002) plane may not be observed. Moreover, it can be said that the smaller the half width (hereinafter, referred to as "W (10)") of the peak of the carbon (10) plane derived from the in-plane diffraction of the single-layer graphene, the larger the crystallite in the plane direction and the larger the crystallite in the plane direction, the larger the size of the graphene of the single layer.

In general, the lower the crystallinity of the carbon material, the larger both the W (002) and the W (10) tend to be. Therefore, in various carbon materials such as carbon black and activated carbon, in a case where the number of lamination of the graphene is reduced, the size of the graphene is also reduced, the number of lamination of the graphene is small, and the structure in which the size of the single-layer graphene is large is not formed.

Specifically, in a case where the W (002) is less than 5°, the number of lamination of the graphene is not sufficiently reduced and the specific surface area is high. Even in a case where the W (10) is more than 3.2°, it is difficult to increase the thermal conduction property and the conductivity because the size of the graphene is not sufficient.

The W (002) is, for example, preferably 6° or more from the viewpoint of improving the thermal conduction property, the conductivity, and the flexibility of the molded product. An upper limit of the W (002) is, for example, 8° or less.

The W (10) is, for example, preferably 2° or more and 3.2° or less from the viewpoint of improving the thermal conduction property, the conductivity, and the flexibility of the molded product.

The X-ray diffraction measurement is carried out as follows.

Specifically, a sample is placed on a silicon non-reflective plate, and the measurement is performed by using an X-ray diffractometer XRD-6100 manufactured by Shimadzu Corporation under the following conditions.

Measurement Condition
Radiation source Cu-K$\alpha$
Voltage 40 kV
Current 30 mA

Moreover, from the obtained X-ray diffraction spectrum, the presence or absence of the peak derived from the (002) plane of carbon, the half width W (002) of the peak derived from the (002) plane of carbon, and the half width W (10) of the peak derived from the (10) plane of carbon are obtained.

Raman Spectroscopic Characteristic

The graphene mesosponge preferably has, for example, Raman spectroscopic characteristic shown in the following (3), from the viewpoint of improving the thermal conduction property, the conductivity, and the flexibility of the molded product.

(3): A ratio (G'/G) of a peak intensity (G') of a G' band measured near 2,670 $cm^{-1}$ and a peak intensity (G) of a G band measured near 1,590 $cm^{-1}$ by a Raman spectroscopy is 0.6 or more. However, an upper limit of the ratio (G'/G) is, for example, 4 or less.

Here, in the Raman scattering spectrum of graphite, a G band derived from the laminated layer of the graphene is observed in the vicinity of 1,590 $cm^{-1}$, and a G' band derived from the presence of graphene having a small number of lamination is observed in the vicinity of 2,670 $cm^{-1}$. Moreover, the ratio (G'/G) is about 0.5.

On the other hand, it is known that the ratio (G'/G) is about 4 in the Raman scattering spectrum of single-layer graphene. As the number of lamination increases, the ratio (G'/G) decreases and the spectrum becomes almost the same as graphite in four or more layers (Nano Lett., 2006, 6, 2667-2673, Physics Reports, 2009, 473, 51-87). Therefore, the ratio (G'/G) is an indicator of the presence of the single-layer graphene. It is considered that as the ratio (G'/G) is closer to 4, the structure is similar to a single-layer graphene with few laminated layers and a well-developed basal surface or a proportion of the single-layer graphene contained in the carbon material is high.

In a case where the ratio (G'/G) is 0.6 or more, the thermoelectric creation, electron conductivity, and the elasticity of the graphene mesosponge are likely to be improved due to the graphene sheet having a sufficiently reduced number of lamination.

For example, the ratio (G'/G) is preferably 0.4 or more, more preferably 0.6 or more, and still more preferably 0.7 or more. However, an upper limit of the ratio (G'/G) is, for example, 4 or less.

The G' band of graphene shifts to a lower wavenumber side than the G' band of highly oriented graphite (HOPG), and the half width of the peak is narrow. Therefore, in the graphene mesosponge, preferably, for example, the G' band in the Raman scattering spectrum shifts to the lower wavenumber side than the G' band of highly oriented graphite (HOPG). Accordingly, the thermal conduction property, the electron conductivity, and the elasticity of the graphene mesosponge are likely to be improved.

The peak intensities of the G band and the G' band are measured as follows.

The Raman scattering spectrum is measured using a laser Raman spectrophotometer NRS-3300FL manufactured by Nippon Spectroscopy Co., Ltd. Measurement conditions are as follows.

From the Raman scattering spectrum, the peak intensity (height) of each band is obtained after drawing a baseline and removing an influence of the background. Moreover, the half width is obtained from the peak intensity (height) of each band.

Raman Scattering Spectrum Measurement Condition
Laser wavelength: 532.2 nm
Exposure time: 20 sec
Cumulative number: 20 times
Center wave number: 2,250 cm$^{-1}$
Slit width: 0.1×6 mm
Dimmer (measurement): OD1
Dimmer (observation): OD5
Objective lens: UMPLFL100×
Data acquisition interval: 0.5 cm$^{-1}$
BET Specific Surface Area A BET specific surface area of the graphene mesosponge is, for example, preferably, 250 m$^2$/g or more, more preferably 500 m$^2$/g or more, still more preferably 800 m$^2$/g or more, from the viewpoint of improving the thermal conduction property, the conductivity, and the flexibility of the molded product.

However, for example, larger BET specific surface area of the graphene mesosponge is more preferable. For example, the BET specific surface area is 2,600 m$^2$/g or less (preferably 2,500 m$^2$/g or less).

In a case where the BET specific surface area of the graphene mesosponge is within the above range, since the single-layer graphene having a developed basal surface is present, the thermal conduction property, the electron conductivity, and the elasticity of the graphene mesosponge are likely to be improved.

The BET specific surface area is measured as follows.

Using a high-precision automatic gas/steam adsorption amount measuring device (manufactured by Nippon Bell Co., Ltd.: BEL SORP MAX), the measurement is performed at a temperature of −196° C., and a nitrogen adsorption/desorption isotherm of the sample is measured. Before the measurement, the sample is vacuum-heated and dried at 150° C. for 6 hours.

Using the BET method, the BET specific surface area is determined by a multipoint method on the nitrogen adsorption isotherm measured in a range of relative pressure of 0.1<P/P0<0.30.

Particle Size

The graphene mesosponge is formed of, for example, an aggregate of primary particles having pores.

An average secondary particle size of the graphene mesosponge is, for example, preferably 5 nm or more and 10 µm or less, more preferably 10 nm or more and 1 µm or less, and still more preferably 20 nm or more and 0.5 µm or less, from a viewpoint of improving the thermal conduction property, the conductivity, and the flexibility of the molded product.

An average primary particle size of the graphene mesosponge is, for example, preferably 1 nm or more and 1 µm or less, more preferably 2 nm or more and 0.1 µm or less, and still more preferably 3 nm or more and 0.02 µm or less, from a viewpoint of improving the thermal conduction property, the conductivity, and the flexibility of the molded product.

The particle size is measured by observation with a transmission electron microscope (TEM).

The transmission electron microscope (TEM) observation is carried out using a transmission electron microscope JEM-2010 manufactured by JEOL Ltd. at an acceleration voltage of 200 kV. During the observation, an acceleration voltage is set to 200 kV. When performing the TEM observation, a small amount of ethanol is added to the sample and then suspended by an ultrasonic treatment (45 kHz, 30 minutes). A small amount of the suspension is added dropwise in a microgrid (Okenshoji Co., Ltd.: Cu150P grid, carbon reinforced, grid pitch 150 µm) and dried at 50° C. under vacuum for 2 hours to obtain a sample for the TEM observation.

Five samples (that is, graphene mesosponge) are observed by transmission electron microscope (TEM) observation, and the secondary particle size and the primary particle size of the sample are measured, respectively. Then, a value obtained by arithmetically averaging the measured particle sizes is set as an average secondary particle size and an average primary particle size of the graphene mesosponge.

The "particle size" refers to the maximum distance between two points on a contour line of the graphene mesosponge when the graphene mesosponge is observed.

Structure of Graphene Mesosponge

The graphene mesosponge is, for example, a porous carbon material (shell-like graphene laminated body) formed of three-dimensionally continuous graphene sheets along the shape of mesopores and having the several or less laminated layers of the graphene sheets. The graphene mesosponge is, for example, particularly preferably a porous carbon material formed only of a single-layer graphene without a defect.

In the graphene mesosponge, from the viewpoint of improving the thermal conduction property, the conductivity, and the flexibility of the molded product, the number of lamination of graphene sheets is, for example, preferably several layers or less, more preferably one layer or more and two or less layers, and more preferably one layer. The graphene sheet with a sufficiently reduced number of lamination sufficiently is likely to improve the BET specific surface area of the graphene mesosponge, and improve thermoelectric creation, and electron conductivity, and the elasticity of the graphene mesosponge.

The number of lamination of graphene sheets is determined by the average number of laminations of carbon layers in the alumina nanoparticles as a template, which will be described later.

Pore Size

An average pore size of the graphene mesosponge is, for example, preferably 0.5 nm or more and 10 nm or less, and more preferably 0.7 nm or more and 8 nm or less, from a viewpoint of improving the thermal conduction property, the conductivity, and the flexibility of the molded product. In a case where the average pore size is in the above range, it becomes easy to easily obtain the graphene mesosponge (shell-like graphene laminated body) having a structure in which several or less (for example, 5 layers or less, preferably 1 to 2 layers) graphene sheets are laminated along the shape of the pores.

An average pore size is measured as follows.

The nitrogen adsorption/desorption isotherm of the sample is measured in the same manner as the BET specific surface area.

The pore size distribution is determined from the nitrogen adsorption/desorption isotherm by a BJH method.

The average pore size d is assumed to be a cylindrical pore, and is determined from a BET specific surface area S and a total pore volume V by an average pore size dd=4 V/S.

Total Pore Volume

The total pore volume of the graphene mesosponge is, for example, preferably 0.5 cm$^3$/g or more, 0.9 cm$^3$/g or more, 2.5 cm$^3$/g or more, 2.6 cm$^3$/g or more, 2.7 cm$^3$/g or more, or 2.8 cm$^3$/g or more, from the viewpoint of improving the thermal conduction property, the conductivity, and the flexibility of the molded product.

The total pore volume of the graphene mesosponge is, for example, preferably 5.0 cm³/g or less or 4.0 cm³/g or less, from the viewpoint of ensuring mechanical strength of the molded product.

The volume of the mesopores in the graphene mesosponge is, for example, preferably 0.8 cm³/g or more, 1.0 cm³/g or more, or 1.3 cm³/g or more, from the viewpoint of improving the thermal conduction property, the conductivity, and the flexibility of the molded product.

The total pore volume is measured as follows.

The nitrogen adsorption/desorption isotherm of the sample is measured in the same manner as the BET specific surface area.

A relative pressure ($P/P_0$) is determined from an adsorption amount of 0.96 from the nitrogen adsorption/desorption isotherm.

The volume of the micropores can be determined by a Dubinin Radushkevich (DR) method, and the volume of the mesopores in the graphene mesosponge can be determined from a difference between the total pore volume and the volume of the micropores.

Porosity

A porosity of the graphene mesosponge is, for example, preferably 30% by volume or more and 90% by volume or less, more preferably 40% by volume or more and 85% by volume or less, and still more preferably 50% by volume or more and 80% by volume or less, from the viewpoint of improving the thermal conduction property, the conductivity, and the flexibility of the molded product.

The porosity is measured as follows.

The volume and number of a graphene portion of the primary particles of the graphene mesosponge and the volume and number of pores of the primary particle are measured using an X-ray CT (CT=Computed Tomography), and the porosity is calculated from a d between the total volume of the graphene portion and the total volume of the pores.

Content

A content of the graphene mesosponge is, for example, preferably 2% by volume or more and 10% by volume or less, more preferably 2.5% by volume or more and 9% by volume or less, and still more preferably 3% by volume or more and 8% by volume or less with respect to the molded product, from the viewpoint of improving the thermal conduction property, the conductivity, and the flexibility of the molded product.

Method for Manufacturing Graphene Mesosponge

The graphene mesosponge can be manufactured, for example, through a first step of preparing carbon-coated alumina nanoparticles by using alumina nanoparticles as a template and coating the template with a carbon layer, a second step of obtaining a porous carbon material called carbon mesosponge (CMS) by removing the template, and a third step of heat-treating the porous carbon material called the carbon mesosponge (CMS).

In the first step, an average particle size of the alumina nanoparticles as the template may be, for example, 5 nm or more and 30 nm or less. Accordingly, it is possible to control the pore size, the total pore volume, and the porosity of the obtained graphene mesosponge, for example, within a preferable range.

In the second step, for the removing of the template, for example, a dissolution removal method using a liquid such as hydrogen fluoride (HF) can be adopted.

In the third step, for example, the temperature is raised from room temperature (25° C.) to 1800° C. over 120 minutes under an inert atmosphere and a reduced pressure of 10 Pa, then a heat-treatment is performed at 800° C. for 60 minutes. Thereafter, natural cooling is performed to room temperature, and the porous carbon material called carbon mesosponge (CMS) is heat-treated. By the heat treatment in the third step, graphene mesosponge (GMS) having high crystals and a high specific surface area can be easily obtained with several or less graphene sheets having few defects.

Here, an average number of laminations carbon layers determined from the BET specific surface area of the template and the carbon coating amount of the alumina nanoparticles is, for example, preferably 10 or less (corresponding to the BET specific surface area of the graphene mesosponge of 263 m²/g or more), and more preferably 5 or less (corresponding to 525 m²/g or more).

From viewpoints of sufficiently strengthening the mechanical strength of the graphene mesosponge and suppressing the structure of the graphene sheet from collapsing and aggregating after removing the template, leading to a decrease in the specific surface area, for example, it is preferable that an average number of laminations of the carbon layers determined from the BET specific surface area of the template and the carbon coating amount is 1 or more.

The average number of laminations is measured as follows.

A thermogravimetric analysis measurement (TG measurement) is performed with the Shimadzu differential thermal/thermal weight simultaneous measuring device (DTG-60/60H). The sample is heated to 100° C. at 10° C./min under synthetic air flow (50 cc/min) and held for 30 minutes, then heated to 800° C. at 5° C./min and held for 1 hour, and cooled to 100° C. at −10° C./min and held for 30 minutes. The carbon coating amount (carbon-supported amount) is determined from a difference in average mass when the sample is held at 100° C. before and after heating to 800° C. The carbon-supported amount is determined in terms of % by mass with respect to the total mass of the alumina nanoparticles and the carbon with which the alumina nanoparticles are coated.

Moreover, from the value of the BET specific surface area of the alumina nanoparticles and the value of the carbon-supported amount determined by the TG measurement above, the average number of laminations of the carbon layers is also determined by the following equation.

$$N=W/(S \times g)$$ Equation:

Here, in the equation, N is the average number of laminations of the carbon layers, W is the carbon-supported amount, S is the specific surface area of alumina, and g is the weight per unit area (0.000761 g/m²) of one graphene sheet.

Other Additives

The molded product according to the present exemplary embodiment may contain, in addition to the graphene mesosponge, additives known in each use, such as a thermally conductive filler (carbide such as carbon black and carbon nanotube), crystalline silica, iron oxide, alumina, metallic silicon, titanium oxide, silicon carbide, talc, mica, kaolin, calcium carbonate, calcium silicate, magnesium oxide, graphite, silicon nitride, boron nitride, cerium oxide, magnesium carbonate, and the like, depending on the use of the molded product.

In particular, the molded product according to the present exemplary embodiment preferably further contains, for example, the carbon nanotubes from the viewpoint of improving the thermal conduction property, the conductivity, and the flexibility of the molded product. Since the carbon nanotube is an elongated fibrous carbon material, it is easy to connect the graphene mesosponges blended in the molded product at a distance by heat conduction or electron conduction and to be blended in the molded product. Therefore, in a case where the carbon nanotube is included, the thermal conduction property and the conductivity of the molded product are likely to be improved. In addition, even in a case where the amount of the graphene mesosponge is small, the thermal conduction property and the conductivity of the molded product are improved, so that the flexibility of the molded product is also improved.

Examples of the carbon nanotube include a single-walled carbon nanotube and a multi-walled carbon nanotubes having two or more layers.

Examples of the carbon nanotubes include a carbon nanohorn (having a horn shape that continuously expands from one end to the other end), which is a variant of the single-walled carbon nanotube, and nanotubes which do not have a strictly tube shape, such as a carbon nanocoil (having coil shape which is a spiral coil form as a whole), carbon nanobeads (having a shape in which a tube is provided in the center and the tube penetrates spherical beads consisting of amorphous carbon or the like), a cup-stacked nanotube, and a carbon nanotube whose outer periphery is covered with the carbon nanohorn or amorphous carbon.

Examples of the carbon nanotubes include metal-encapsulated nanotubes in which a metal or the like is encapsulated in carbon nanotubes and peapod nanotubes in which fullerenes or metal-encapsulated fullerenes are encapsulated in carbon nanotubes.

An average length of the carbon nanotubes is, for example, preferably 5 μm or more, more preferably 6 μm or more, and still more preferably 7 μm or more, from the viewpoint of improving the thermal conduction property, the conductivity, and the flexibility of the molded product. However, an upper limit of the average length of the carbon nanotubes may be, for example, 50 μm or less.

An average diameter of the carbon nanotubes is, for example, preferably 20 nm or more and 300 nm or less, more preferably 25 nm or more and 250 nm or less, and still more preferably 30 nm or more and 200 nm or less.

The average length and the average diameter of the carbon nanotubes are measured as follows.

A cross section of the molded product is observed with an electron microscope and a length and a diameter of the carbon nanotube are measured. The number of measurement samples is set to 5, and the average length and the average diameter of the carbon nanotubes are the arithmetic mean values of 5 samples, respectively.

A content of the carbon nanotubes is, for example, preferably 1% by volume or more and 3% by volume or less, more preferably 1.25% by volume or more and 2.75% by volume or less, and still more preferably 1.5% by volume or more and 2.5% by volume or less with respect to the polymer material molded product, from the viewpoint of improving the thermal conduction property, the conductivity, and the flexibility of the molded product.

Other Physical Properties of Molded Product

The thermal conductivity of the molded product according to the present exemplary embodiment is, for example, preferably 1.5 W/m·K or more, more preferably 1.75 W/m·K or more, and still more preferably 2.0 W/m·K or more. However, an upper limit of the thermal conductivity of the molded product is, for example, 5.0 W/mK or less.

The thermal conductivity is measured under a condition of a load of 50 g by a temperature wave analysis method using ai-phase (manufactured by ai-Phase Co.).

The Young's modulus of the molded product according to the present exemplary embodiment is, for example, preferably 1.0 MPa or less, more preferably 0.9 MPa or less, still more preferably 0.8 MPa or more. However, a lower limit of the Young's modulus of the molded product is, for example, 0.2 MPa or more.

The Young's modulus is measured with RHEOVIBRON (manufactured by ORIENTEC CO., LTD.) at an amplitude of 50 μm and a frequency of 10 Hz. As the Young's modulus, a value at 150° C. is adopted.

The ASKER A hardness of the molded product according to the present exemplary embodiment is, for example, preferably 40° or less, more preferably 35° or less, and till more preferably 30° or less. However, a lower limit of the ASKER A hardness of the molded product is, for example, 10° or more.

The ASKER A hardness is measured using a durometer such as ASKER A (manufactured by KOBUNSHI KEIKI CO., LTD.) in accordance with JIS K 6253-3:2012.

The volume resistivity of the molded product according to the present exemplary embodiment is, for example, preferably 1 [Ω·cm] or more and $10^7$ [Ω·cm] or less, more preferably 1 [Ω·cm] or more and $10^6$ [Ω·cm] or less, and still more preferably $10^2$ [Ω·cm] or more and $10^5$ [Ω·cm] or less.

The volume resistivity is measured as follows.

A micro ammeter (R8430A manufactured by Advantest) is used as a resistance measuring machine, and a UR probe (manufactured by Mitsubishi Chemical Corporation) is used as a probe. The volume resistivity [Ω·cm] of the endless belt is measured at 5 points at a voltage of 100 V, for an applying time of 5 seconds, at a pressurization of 1 kgf, to calculate a mean value. In addition, the measurement is performed in an environment of a temperature of 22° C. and a humidity of 55% RH.

Use or the Like of Molded Product

The molded product according to the present exemplary embodiment is used for an elastic layer of a fixing member, an artificial muscle, a pressure sensor, a tactile sensor, a dielectric sensor, and the like.

The shape of the molded product according to the present exemplary embodiment is selected according to the use. For example, in a case where the molded product is used for an elastic layer of a fixing member, an artificial muscle, a pressure sensor, a tactile sensor, or the like, the molded product is a layered molded product.

Fixing Member

The fixing member according to the present exemplary embodiment will be described.

FIG. 1 is a schematic cross sectional diagram showing an example of the fixing member according to the present exemplary embodiment.

As shown in FIG. 1, the fixing member 110 according to the present exemplary embodiment includes, for example, a base material 110A, an elastic layer 110B provided on the base material 110A, and a surface layer 110C provided on the elastic layer 110B. However, the surface layer 100C is a layer provided as needed.

Moreover, the molded product according to the present exemplary embodiment is applied to the elastic layer 110B.

The molded product has the high thermal conduction property and the high flexibility by applying the molded product according to the present exemplary embodiment to the elastic layer 110B. Therefore, the fixing member 110 according to the present exemplary embodiment is realized to, for example, 1) shorten the time (hereinafter referred to as "warm-up time") required to increase the temperature from room temperature to a temperature at which fixing is possible, 2) suppress fixing unevenness due to a temperature difference of the fixing member that occurs between a recording medium passing portion and a recording medium non-passing portion in previous fixing, when a toner image is fixed on a recording medium having a different size after the toner image is continuously fixed on a recording medium, and 3) improve followability to the recording medium with large irregularities (such as embossed paper).

The fixing member 110 according to the present exemplary embodiment is not limited to the above layer configuration, and for example, may have a layer configuration in which a metal layer or a protective layer thereof is interposed between the base material 110A and the elastic layer 110B, as needed.

Hereinafter, details of the fixing member according to the present exemplary embodiment will be described. The description will be made without reference numerals.

Hereinafter, components of the fixing member according to the present exemplary embodiment will be described in detail.

Shape of Fixing Member

The fixing member according to the present exemplary embodiment may have a roll shape or a belt shape.

Base Material

In a case where the fixing member has the roll shape, examples of the base material include a cylindrical body formed of a metal (such as aluminum, SUS, iron, and copper), an alloy, ceramics, and a fiber reinforced metal (FRM).

In a case where the fixing member has the roll shape, an outer diameter and a wall thickness of the base material may be, for example, an outer diameter of 10 mm or more and 50 mm or less. For example, in a case of aluminum made, the thickness is 0.5 mm or more and 4 mm or less, and in a case of stainless steel (SUS) made or iron made, the thickness is 0.1 mm or more and 2 mm or less.

On the other hand, in a case where the fixing member has the belt shape, examples of the base material include a metal belt (for example, a metal belt of nickel, aluminum, stainless steel, or the like) or a resin belt (for example, a resin belt of polyimide, polyamideimide, polyphenylene sulfide, polyether etherketone, polybenzimidazole, or the like).

The volume resistivity may be controlled by adding and dispersing a conductive powder or the like to the resin belt. Specifically, examples of the resin belt include a polyimide belt in which the volume resistivity is controlled by adding and dispersing carbon black. In addition, examples of the resin belt include a belt formed by combining both ends of a long polyimide sheet on a puzzle and thermocompression bonding using a thermocompression bonding member to form the belt shape.

In a case where the fixing member has the belt shape, the thickness of the base material may be, for example, 20 μm or more and 200 μm or less, and is desirably 30 μm or more and 150 μm or less, and more desirably 40 μm or more and 130 μm or less.

Elastic Layer

The molded product according to the present exemplary embodiment is applied to the elastic layer. In the elastic layer, an elastic material is applied as a polymer material of the molded product.

Various additives may be blended in the elastic layer. Examples of the additives include a softening agent (such as paraffin-based softening agent), a processing aid (such as stearic acid), an anti-aging agent (such as amine-based anti-aging agent), a vulcanizing agent (such as sulfur, metal oxide, and peroxide), and a functional filler (such as alumina).

The thickness of the elastic layer may be, for example, preferably 20 μm or more and 1,000 μm or less, and is preferably 30 μm or more and 800 μm or less, and more preferably 100 μm or more and 500 μm or less.

Surface Layer

The surface layer is formed by containing, for example, a heat-resistant release material.

Examples of the heat-resistant release material include a fluororubber, a fluororesin, a silicone resin, and a polyimide resin.

Among these, for example, the fluororesin may be used as the heat-resistant release material.

Specific examples of the fluororesin include a tetrafluoroethylene/perfluoroalkyl vinyl ether copolymer (PFA), polytetrafluoroethylene (PTFE), a tetrafluoroethylene/hexafluoropropylene copolymer (FEP), a polyethylene/tetrafluoro ethylene copolymer (ETFE), polyvinylidene fluoride (PVDF), polychlorotrifluoroethylene (PCTFE), and vinyl fluoride (PVF).

The thickness of the surface layer may be, for example, 5 μm or more and 100 μm or less, and is for example, preferably 5 μm or more and 50 μm or less, and more preferably 10 μm or more and 40 μm or less, in terms of suppressing density unevenness of the formed image.

The inner surface of a tube for forming the surface layer may be previously subjected to an adhesion treatment, in order to enhance adhesiveness with the elastic layer. Examples of the adhesion treatment include a liquid ammonia treatment, a sodium naphthalene treatment, an excimer laser treatment, and a plasma treatment. Thereafter, both ends of the fluororesin tube are cut to have a target length to obtain a fixing member.

Use of Fixing Member

The fixing member according to the present exemplary embodiment is applied to, for example, any of a heating roll, a pressure roll, a heating belt, and a pressure belt. For a heat source in the heating roll and the heating belt, a type of heating from an external heat source, a type of heating by an electromagnetic induction method, and the like may be used.

Fixing Device

The fixing device according to the present exemplary embodiment has various configurations, for example, includes a first rotating body and a second rotating body arranged in contact with an outer surface of the first rotating body. Moreover, the fixing member according to the present exemplary embodiment is applied as least one of the first rotating body or the second rotating body.

Hereinafter, as the first and second exemplary embodiments, a fixing device including the heating belt and the pressure roll will be described. Moreover, in the first and second exemplary embodiments, the fixing member according to the present exemplary embodiment may be applied to both the heating belt and the pressure roll.

The fixing device according to the present exemplary embodiment is not limited to the first and second exemplary embodiments, and may be a fixing device including a heating roll or a heating belt and a pressure belt. The fixing member according to the present exemplary embodiment may be applied to all the heating roll, the heating belt, and the pressure belt.

In addition, the fixing device according to the present exemplary embodiment is not limited to the first and second exemplary embodiments, and may be an electromagnetic induction heating type fixing device.

First Exemplary Embodiment of Fixing Device

Figure 2:
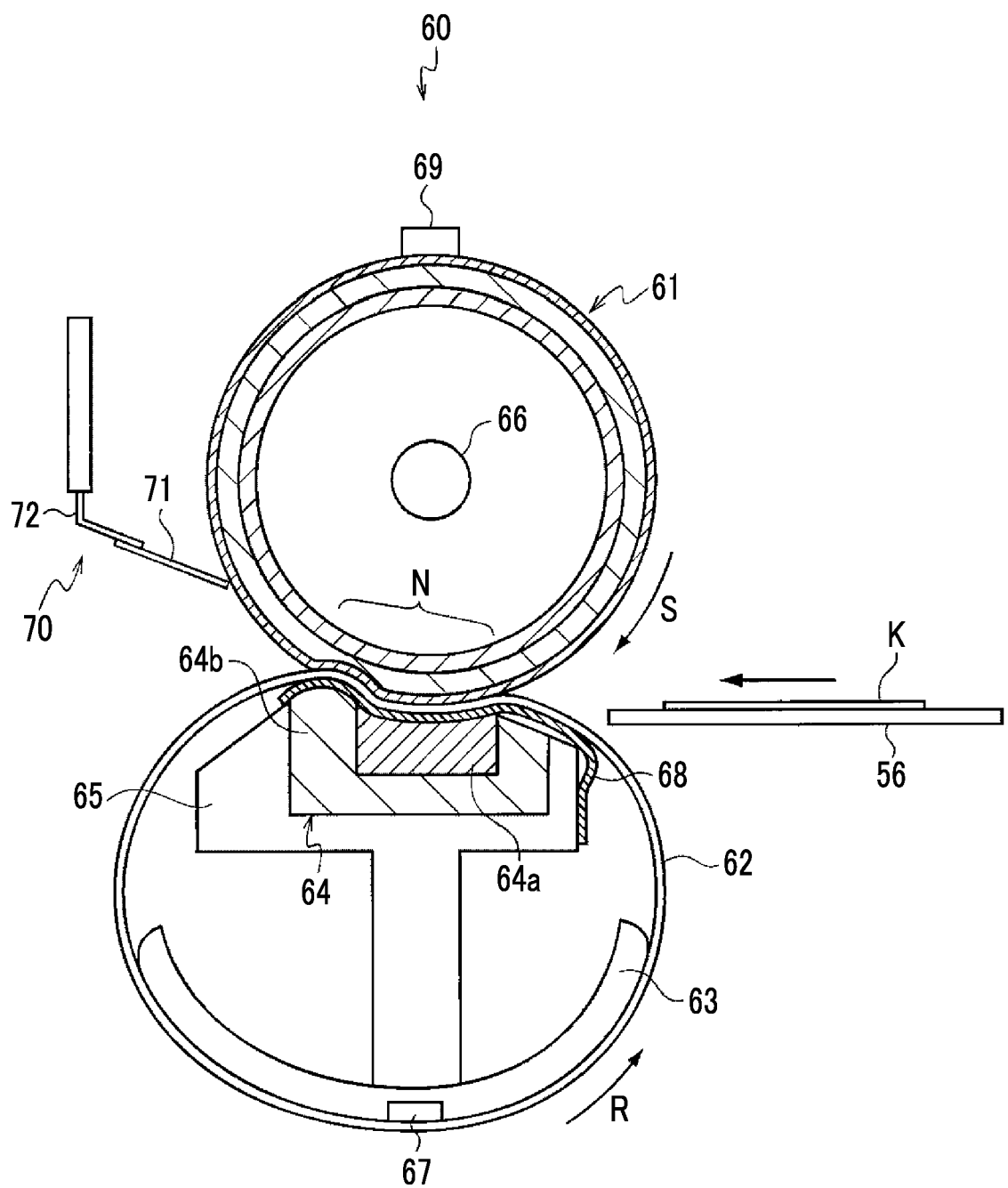
FIG. 2 is a schematic configuration diagram showing an example of a fixing device according to a first exemplary embodiment.

The fixing device according to the first exemplary embodiment will be described. FIG. 2 is a schematic diagram showing an example of the fixing device according to a first exemplary embodiment.

As shown in FIG. 2, the fixing device 60 according to the first exemplary embodiment is configured to include, for example, a heating roll 61 (an example of a first rotating body) driven to rotate, a pressure belt 62 (an example of a second rotating body), and a pressing pad 64 (an example of pressing member) that presses the heating roll 61 via the pressure belt 62.

Regarding the pressing pad 64, for example, the pressure belt 62 and the heating roll 61 may be relatively pressed. Therefore, a pressure belt 62 side may be pressed to the heating roll 61, and a heating roll 61 side may be pressed to the pressure belt 62.

A halogen lamp 66 (an example of heating device) is arranged inside the heating roll 61. The heating device is not limited to the halogen lamp, and other heat-generating members that generate heat may be used.

On the other hand, for example, a temperature sensitive element 69 is arranged in contact with the surface of the heating roll 61. The lighting of the halogen lamp 66 is controlled based on a temperature measurement value by the temperature sensitive element 69, and a surface temperature of the heating roll 61 is maintained at a target set temperature (for example, 150° C.)

The pressure belt 62 is rotatably supported by, for example, a pressing pad 64 arranged therein and a belt traveling guide 63. In a sandwiching region N (nip portion), the pressure belt is arranged by being pressed against the heating roll 61 by the pressing pad 64.

The pressing pad 64 is arranged in a state of being pressed to the heating roll 61 via the pressure belt 62 inside the pressure belt 62, and forms a sandwiching region N with the heating roll 61, for example.

In the pressing pad 64, for example, a front sandwiching member 64a for securing a wide sandwiching region N is arranged on an inlet side of the sandwiching region N, and a peeling sandwiching member 64b for giving distortion to the heating roll 61 is arranged on an outlet side of the sandwiching region N.

In order to reduce sliding resistance between an inner peripheral surface of the pressure belt 62 and the pressing pad 64, for example, a sheet-like sliding member 68 is provided on a surface of the front sandwiching member 64a and the peeling sandwiching member 64b in contact with the pressure belt 62. The pressing pad 64 and the sliding member 68 are held by a metal holding member 65.

The sliding member 68 is provided, for example, so that a sliding surface thereof is in contact with an inner peripheral surface of the pressure belt 62, and is involved in holding and supplying an oil existing between the sliding member 68 and the pressure belt 62.

For example, a belt traveling guide 63 is attached to the holding member 65, and the pressure belt 62 is configured to rotate.

The heating roll 61 rotates, for example, in a direction of an arrow S by a drive motor (not shown), and the pressure belt 62 rotates by being driven the rotation of the heating roll 61, in a direction of an arrow R opposite to the rotation direction of the heating roll 61. That is, for example, the heating roll 61 rotates clockwise in FIG. 2, while the pressure belt 62 rotates counterclockwise.

Then, paper K (an example of the recording medium) having an unfixed toner image is guided by, for example, the fixing inlet guide 56 and transported to the sandwiching region N. In a case where the paper K passes through the sandwiching region N, the toner image on the paper K is fixed by the pressure and heat acting on the sandwiching region N.

In the fixing device 60 according to the first exemplary embodiment, for example, a concave front sandwiching member 64a that follows the outer peripheral surface of the heating roll 61 secures a wider sandwiching region N as compared with a configuration without the front sandwiching member 64a.

Further, for example, by arranging the peeling sandwiching member 64b so as to protrude from the outer peripheral surface of the heating roll 61, the fixing device 60 according to the first exemplary embodiment is configured such that the distortion of the heating roll 61 becomes locally large in the outlet region of the sandwiching region N.

In a case where the peeling sandwiching member 64b is arranged in this manner, for example, the paper K after fixing passes through locally large formed distortion when passing through the peeling sandwiching region, and thus the paper K is easy to be peeled off from the heating roll 61.

As an auxiliary device for peeling, for example, a peeling member 70 is arranged on a downstream side of the sandwiching region N of the heating roll 61. The peeling member 70 is, for example, held by the holding member 72 in a state where a peeling claw 71 is close to the heating roll 61 in a direction facing the rotation direction of the heating roll 61 (counter direction).

Second Exemplary Embodiment of Fixing Device

Figure 3:
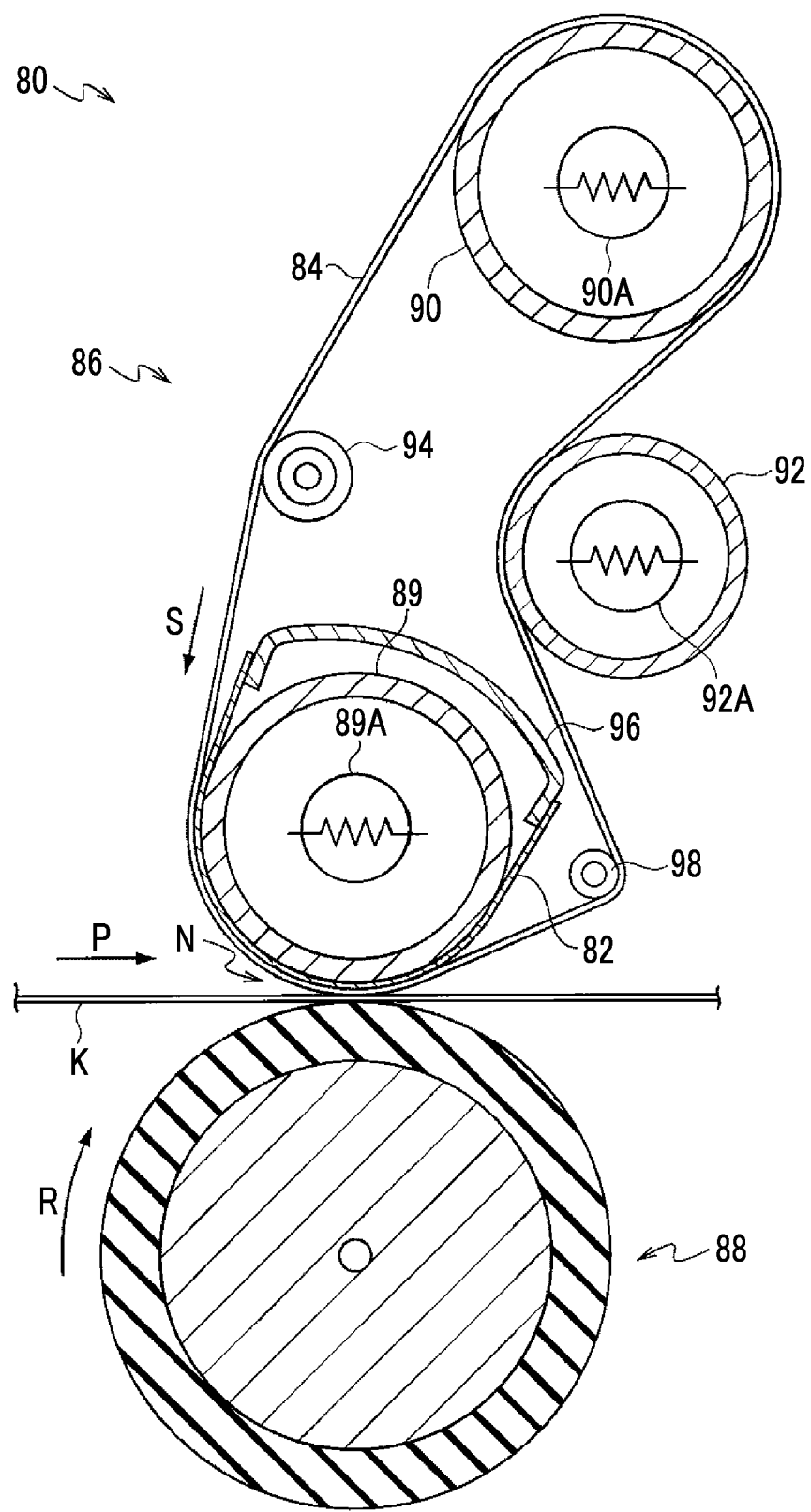
FIG. 3 is a schematic configuration diagram showing an example of a fixing device according to a second exemplary embodiment.

The fixing device according to the second exemplary embodiment will be described. FIG. 3 is a schematic diagram showing an example of a fixing device according to a second exemplary embodiment.

As shown in FIG. 3, the fixing device 80 according to the second exemplary embodiment is configured to include, for example, a fixing belt module 86 including a heating belt 84 (an example of the first rotating body) and a pressure roll 88 (an example of the second rotating body) arranged by being pressed to the heating belt 84 (the fixing belt module 86). For example, the sandwiching region N (nip portion) where the heating belt 84 (fixing belt module 86) and the pressure roll 88 are in contact with each other is formed. In the sandwiching region N, the paper K (an example of the recording medium) is pressed and heated, and the toner image is fixed.

The fixing belt module 86 includes, for example, an endless heating belt 84, a heating pressing roll 89 around which the heating belt 84 is wound on the pressure roll 88 side, and which is rotationally driven by the rotational force of a motor (not shown) and presses the heating belt 84 from an inner peripheral surface thereof toward the pressure roll 88, and a support roll 90 that supports the heating belt 84 from the inside at a position different from the heating pressing roll 89.

The fixing belt module 86 is, for example, provided with a support roll 92 that is arranged outside the heating belt 84 and defines a circuit path thereof, and a posture correction roll 94 that corrects the posture of the heating belt 84 from the heating pressing roll 89 to the support roll 90, and a support roll 98 that applies tension to the heating belt 84 from the inner peripheral surface on the downstream side of the sandwiching region N which is a region where the heating belt 84 (fixing belt module 86) and the pressure roll 88 are in contact with each other.

The fixing belt module 86 is provided, for example, so that a sheet-like sliding member 82 is interposed between the heating belt 84 and the heating pressing roll 89.

The sliding member 82 is provided, for example, so that a sliding surface thereof is in contact with an inner peripheral surface of the heating belt 84, and is involved in holding and supplying an oil existing between the sliding member 82 and the heating belt 84.

Here, the sliding member 82 is provided, for example, in a state where both ends thereof are supported by the support member 96.

Inside the heating pressing roll 89, for example, a halogen heater 89A (an example of heating device) is provided.

The support roll 90 is, for example, a cylindrical roll formed of aluminum, and a halogen heater 90A (an example of heating device) is arranged inside, so that the heating belt 84 is heated from the inner peripheral surface side.

At both ends of the support roll 90, for example, spring members (not shown) that press the heating belt 84 outward are arranged.

The support roll 92 is, for example, a cylindrical roll made of aluminum, and a release layer consisting of a fluororesin having a thickness of 20 μm is formed on a surface of the support roll 92.

The release layer of the support roll 92 is formed, for example, to prevent a toner or a paper dust from the outer peripheral surface of the heating belt 84 from accumulating on the support roll 92.

For example, a halogen heater 92A (an example of the heating source) is arranged inside the support roll 92 so that the heating belt 84 is heated from the outer peripheral surface side.

That is, for example, the heating pressing roll 89, the support roll 90, and the support roll 92 are configured to heat the heating belt 84.

The posture correction roll 94 is, for example, a columnar roll formed of aluminum, and an end position measurement mechanism (not shown) for measuring the end position of the heating belt 84 is arranged in the vicinity of the posture correction roll 94.

The posture correction roll 94 is provided with, for example, an axial displacement mechanism (not shown) that displaces a contact position of the heating belt 84 in an axial direction according to the measurement result of the end position measurement mechanism, and is configured to control meandering of the heating belt 84.

On the other hand, the pressure roll 88 is provided, for example, rotatably supported, and the heating belt 84 is provided by being pressed against a portion wound around the heating pressing roll 89 by an urging device such as a spring (not shown). As a result, as the heating belt 84 (heating pressing roll 89) of the fixing belt module 86 moves rotationally in a direction of an arrow S, the pressure roll 88 follows the heating belt 84 (heating pressing roll 89) and moves rotationally in a direction of an arrow R.

Moreover, the paper K having the unfixed toner image (not shown) is fixed by the pressure and the heat acting on the sandwiching region N, when being transported in a direction of the arrow P and guided to the sandwiching region N of the fixing device 80.

In the fixing device 80 according to the second exemplary embodiment, a form in which the halogen heater (halogen lamp) is adopted as an example of the heating source has been described, but the present disclosure is not limited thereto. A radiation lamp heating element (a heating element that generates radiation (such as infrared rays) and a resistance heating element (heating element that generates Joule heat by passing an electric current through a resistor: for example, a ceramic substrate formed with a film having resistance and fired) may be adopted.

Image Forming Apparatus

Next, the image forming apparatus according to the present exemplary embodiment will be described.

An image forming apparatus according to the present exemplary embodiment includes an image holder, a charging device that charges a surface of the image holder, a latent image forming device that forms a latent image on the charged surface of the image holder, a developing device that develops the latent image by a toner to form a toner image, a transfer device that transfers the toner image to a recording medium, and a fixing device that fixes the toner image to the recording medium. Moreover, as the fixing device, the fixing device according to the present exemplary embodiment is adopted.

Hereinafter, the image forming apparatus according to the present exemplary embodiment will be described with reference to the drawings.

Figure 4:
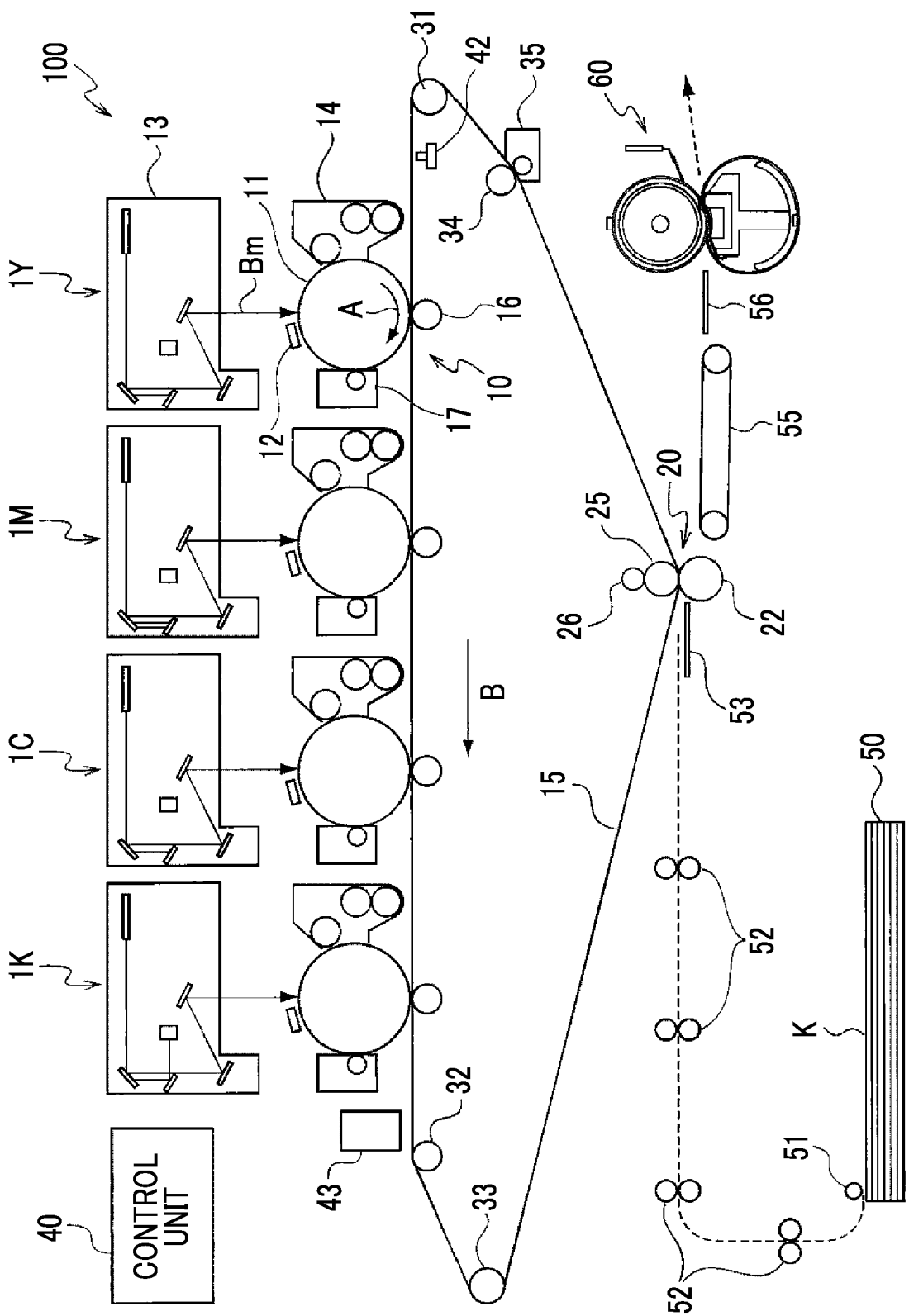
FIG. 4 is a schematic configuration diagram showing an example of an image forming apparatus according to the present exemplary embodiment.

FIG. 4 is a schematic configuration diagram showing an example of an image forming apparatus according to the present exemplary embodiment.

As shown in FIG. 4, an image forming apparatus 100 according to the present exemplary embodiment is, for example, an intermediate transfer type image forming apparatus generally called a tandem type, and includes: plural image forming units 1Y, 1M, 1C, and 1K in which each color component toner image is formed by electrophotographic method; a primary transfer unit 10 that sequentially transfers (primary transfer) each color component toner image formed by each of the image forming units 1Y, 1M, 1C, and 1K to an intermediate transfer belt 15; a secondary transfer unit 20 that collectively transfers (secondary transfer) superimposed toner image transferred on the intermediate transfer belt 15 to paper K, which is a recording medium; and the fixing device 60 that fixes a secondary transferred image on the paper K. Further, the image forming apparatus 100 has a control unit 40 that controls an operation of each device (each unit).

The fixing device 60 is the fixing device 60 according to the first exemplary embodiment described above. The image forming apparatus 100 may be configured to include the fixing device 80 according to the second exemplary embodiment described above.

Each of the image forming units 1Y, 1M, 1C, and 1K of the image forming apparatus 100 includes a photoconductor 11 that rotates in the direction of the arrow A as an example of an image holder that holds a toner image formed on the surface.

Around the photoconductor 11 as an example of a charging device, a charger 12 that charges the photoconductor 11 is provided and a laser exposure machine 13 (in the drawing, an exposure beam is indicated by the reference numeral Bm) that writes an electrostatic latent image on the photoconductor 11 as an example of the latent image forming device is provided.

Further, around the photoconductor 11, a developing machine 14 in which each color component toner is accommodated and the electrostatic latent image on the photoconductor 11 is visualized by a toner is provided as an example of the developing device, and a primary transfer roll 16 that transfers the toner image of each color component formed on the photoconductor 11 to the intermediate transfer belt 15 by the primary transfer unit 10.

Further, around the photoconductor 11, a photoconductor cleaner 17 that removes a residual toner on the photoconductor 11 is provided, and electrophotographic devices of the charger 12, the laser exposure machine 13, the developing machine 14, the primary transfer roll 16, and the photoconductor cleaner 17 are sequentially provided along the rotation direction of the photoconductor 11. These image forming units 1Y, 1M, 1C, and 1K are arranged substantially linearly in the order of yellow (Y), magenta (M), cyan (C), and black (K) from the upstream side of the intermediate transfer belt 15.

The intermediate transfer belt 15 which is an intermediate transfer body is configured of a film-shaped pressure belt in which a resin such as polyimide or polyamide is used as a base layer and an appropriate amount of an antistatic agent such as carbon black is contained. The intermediate transfer belt is formed to have a volume resistivity of $10^6$ Ωcm or more and $10^{14}$ Ωcm or less, and is configured to have a thickness of, for example, about 0.1 mm.

The intermediate transfer belt 15 is circulated (rotated) by various rolls in a B direction shown in FIG. 4 at a speed appropriate for the purpose. Examples of the various rolls include: a drive roll 31 that is driven by a motor (not shown) having excellent constant speed to rotate the intermediate transfer belt 15; a support roll 32 that supports the intermediate transfer belt 15 extending substantially linearly along the arrangement direction of each photoconductor 11; a tension applying roll 33, which applies tension to the intermediate transfer belt 15 and functions as a correction roll for preventing the intermediate transfer belt 15 from meandering; a back surface roll 25 provided on the secondary transfer unit 20; and a cleaning back surface roll 34 provided in the cleaning portion that scraps off the residual toner on the intermediate transfer belt 15.

The primary transfer unit 10 is configured of the primary transfer roll 16 arranged so as to face the photoconductor 11 with the intermediate transfer belt 15 interposed therebetween. The primary transfer roll 16 is configured of a core body and a sponge layer as an elastic layer fixed around the core body. The core body is a cylindrical rod made of a metal such as iron or SUS. The sponge layer is a sponge-like cylindrical roll which is formed of a blended rubber of NBR, SBR, and EPDM containing a conductive agent such as carbon black and has the volume resistivity of $10^{7.5}$ Ωcm or more and $10^{8.5}$ Ωcm or less.

Then, the primary transfer roll 16 is arranged to be in contact with the photoconductor 11 with the intermediate transfer belt 15 interposed therebetween, and is configured such that a voltage (primary transfer bias) with an opposite polarity to a charging polarity (minus polarity and the same applies below) of the toner is applied to the primary transfer roll 16. As a result, the toner images on the respective photoconductors 11 are sequentially electrostatically attracted to the intermediate transfer belt 15, and the superimposed toner images are formed on the intermediate transfer belt 15.

The secondary transfer unit 20 is configured to include the back surface roll 25 and the secondary transfer roll 22 arranged on the toner image holding surface side of the intermediate transfer belt 15.

In the back surface roll 25, the surface is configured of a tube of the blended rubber of EPDM and NBR rubber in which carbon is dispersed, and the inside is configured of EPDM rubber. Then, the back surface roll is formed to have the surface resistivity of $10^7$ Ω/□ or more and $10^{10}$ Ω/□ or less, and the hardness is set to, for example, 70° (ASKER C: manufactured by KOBUNSHI KEIKI Co., Ltd., the same applies below). The back surface roll 25 is arranged on the back surface side of the intermediate transfer belt 15 to configure a counter electrode of the secondary transfer roll 22, and a power feeding roll 26 made of metal to which the secondary transfer bias is stably applied is contact-arranged.

On the other hand, the secondary transfer roll 22 is configured of a core body and a sponge layer as an elastic layer fixed around the core body. The core body is a cylindrical rod configured of a metal such as iron or SUS. The sponge layer is a sponge-like cylindrical roll which is formed of a blended rubber of NBR, SBR, and EPDM containing a conductive agent such as carbon black and has the volume resistivity of $10^{7.5}$ Ωcm or more and $10^{8.5}$ Ωcm or less.

Moreover, the secondary transfer roll 22 is arranged to be in contact with the back surface roll 25 with the intermediate transfer belt 15 interposed therebetween, and further, the secondary transfer roll 22 is grounded to form a secondary transfer bias with the back surface roll 25. The toner image is secondarily transferred onto the paper K transported to the secondary transfer unit 20.

Further, on the downstream side of the secondary transfer unit 20 of the intermediate transfer belt 15, an intermediate transfer belt cleaner 35 that cleans the surface of the intermediate transfer belt 15 by removing residual toner or paper dust on the intermediate transfer belt 15 after the secondary transfer is provided so as to be attachable and detachable.

The intermediate transfer belt 15, the primary transfer unit 10 (primary transfer roll 16), and the secondary transfer unit 20 (secondary transfer roll 22) correspond to an example of the transfer device.

On the other hand, on the upstream side of the yellow image forming unit 1Y, a reference sensor (home position sensor) 42 that generates a reference signal as a reference for taking the image forming timing in each of the image forming units 1Y, 1M, 1C, and 1K is provided. Further, on the downstream side of the black image forming unit 1K, an image density sensor 43 that adjusts an image quality is arranged. The reference sensor 42 recognizes a mark provided on the back side of the intermediate transfer belt 15 and generates a reference signal. According to an instruction from the control unit 40 based on the recognition of the reference signal, each of the image forming units 1Y, 1M, 1C, and 1K is configured to start image formation.

Further, the image forming apparatus according to the present exemplary embodiment includes, as the transporting device that transports the paper K, a paper accommodating unit 50 that accommodates the paper K; a paper feed roll 51 that takes out and transports the paper K accumulated in the paper accommodating unit 50 at a predetermined timing; a transport roll 52 that transports the paper K fed by the paper feed roll 51; a transport guide 53 that feeds the paper K transported by the transport roll 52 to the secondary transfer unit 20; a transport belt 55 that transports the paper K transported after being secondarily transferred by the secondary transfer roll 22, to the fixing device 60; and a fixing inlet guide 56 that guides the paper K to the fixing device 60.

Next, a basic image forming process of the image forming apparatus according to the present exemplary embodiment will be described.

In the image forming apparatus according to the present exemplary embodiment, image data output from an image reading device (not shown), a personal computer (PC) (not shown), or the like is subjected to image processing by an image processing device (not shown), and then the image forming units 1Y, 1M, 1C, and 1K execute an image forming work.

The image processing device performs image processing such as various image editing such as shading correction, position shift correction, brightness/color space conversion, gamma correction, frame erasing or color editing, and movement editing on the input reflectance data. The image data subjected to the image processing is converted into color material gradation data of four colors of Y, M, C, and K, and is output to the laser exposure machine 13.

In the laser exposure machine 13, for example, the exposure beam Bm emitted from the semiconductor laser is applied to the photoconductors 11 of the image forming units 1Y, 1M, 1C, and 1K according to the input color material gradation data. In each of the photoconductors 11 of the image forming units 1Y, 1M, 1C, and 1K, after the surface is charged by the charger 12, the surface is scanned and exposed by the laser exposure machine 13, and an electrostatic latent image is formed. The formed electrostatic latent image is developed as a toner image of each color of Y, M, C, and K by the each of the image forming units 1Y, 1M, 1C, and 1K.

The toner image formed on the photoconductors 11 of the image forming units 1Y, 1M, 1C, and 1K is transferred onto the intermediate transfer belt 15 in the primary transfer unit 10 in which each photoconductor 11 and the intermediate transfer belt 15 come into contact with each other. More specifically, in the primary transfer unit 10, the primary transfer roll 16 applies a voltage (primary transfer bias) with an opposite polarity to the charging polarity (minus polarity) of the toner to the base material of the intermediate transfer belt 15, and the toner image is sequentially superposed on the surface of the intermediate transfer belt 15 to perform the primary transfer.

After the toner image is sequentially primary transferred to the surface of the intermediate transfer belt 15, the intermediate transfer belt 15 moves and the toner image is transported to the secondary transfer unit 20. In a case where the toner image is transported to the secondary transfer unit 20, in the transporting device, the paper feed roll 51 rotates in accordance with the timing at which the toner image is transported to the secondary transfer unit 20, and the paper K having a target size is supplied from the paper accommodating unit 50. The paper K supplied by the paper feed roll 51 is transported by the transport roll 52 and reaches the secondary transfer unit 20 via the transport guide 53. Before reaching the secondary transfer unit 20, the paper K is temporarily stopped, and the alignment roll (not shown) rotates according to the movement timing of the intermediate transfer belt 15 on which the toner image is held. Therefore, the position of the paper K and the position of the toner image are aligned.

In the secondary transfer unit 20, the secondary transfer roll 22 is pressed against the back surface roll 25 via the intermediate transfer belt 15. In this case, the paper K transported at the same timing is sandwiched between the intermediate transfer belt 15 and the secondary transfer roll 22. At that time, in a case where a voltage (secondary transfer bias) having the same polarity as the charging polarity (minus polarity) of the toner is applied from the power feeding roll 26, a transfer electric field is formed between the secondary transfer roll 22 and the back surface roll 25. The unfixed toner image held on the intermediate transfer belt 15 is electrostatically transferred onto the paper K collectively in the secondary transfer unit 20 pressed by the secondary transfer roll 22 and the back surface roll 25.

Thereafter, the paper K on which the toner image is electrostatically transferred is transported as-is in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner image on the paper K transported to the fixing device 60 is fixed on the paper K by being subjected to a fixing process by heat and pressure by the fixing device 60. The paper K on which the fixed image is formed is transported to an ejected paper accommodating portion (not shown) provided in the ejection unit of the image forming apparatus.

On the other hand, after the transfer to the paper K is completed, the residual toner remaining on the intermediate transfer belt 15 is transported to the cleaning unit as the intermediate transfer belt 15 rotates, and is removed from the intermediate transfer belt 15 by the cleaning back surface roll 34 and the intermediate transfer belt cleaner 35.

Hereinabove, the exemplary embodiments of the present disclosure have been described, but the present disclosure is not limited to the above-described exemplary embodiments, and various modifications, changes, and improvements can be made, and, needless to say, can be realized within the scope of the present disclosure.

EXAMPLES

Hereinafter, the present disclosure will be described in more detail with reference to examples. However, the present disclosure is not limited to the following examples. In the following description, "part(s)" and "%" are all based on mass, unless otherwise specified.

Manufacturing of Porous Carbon Material
Manufacturing of Porous Carbon Material (1)
(1) Preparation of Carbon-Coated Alumina Nanoparticles by Chemical Vapor Deposition (CVD) Method Alumina nanoparticles (TM300 manufactured by Daimei Chemical Industry Co., Ltd., crystal phase: γ-alumina, average particle size: 7 nm, specific surface area: 220 m$^2$/g) and quartz sand (manufactured by Sendai Wako Pure Chemical Industries, Ltd.) as a spacer are mixed at a weight ratio of 3:10 (alumina nanoparticles:quartz sand). In this case, the quartz sand is immersed in 1 M hydrochloric acid for 12 hours, heated in air at 800° C. for 2 hours in a muffle furnace, sieved at intervals of 180 μm, and used. The mixture of the alumina nanoparticles and quartz sand prepared above is placed in a reaction tube (inner diameter 57 mm), and CVD using methane as a carbon source (hereinafter, "methane CVD") is performed.

In methane CVD, alumina nanoparticles are heated from room temperature to 900° C. at a heating rate of 10° C./min under a condition that a flow rate of $N_2$ gas is adjusted to 400 ml/min, and held at 900° C. for 30 minutes. Thereafter, $N_2$ gas is used as a carrier gas, 20% by volume of methane with respect to a total amount of the carrier gas and the methane is introduced into the reaction tube, and the chemical vapor deposition (CVD) treatment is performed at 900° C. for 4 hours. In this case, the flow rate of the methane gas is adjusted to 80 ml/min, and the flow rate of the $N_2$ gas is adjusted to 320 ml/min. Then, the introduction of the methane gas is stopped, and the mixture is held at 900° C. for 30 minutes under the condition that the flow rate of the $N_2$ gas is adjusted to 400 ml/min, and then cooled to obtain the carbon-coated alumina nanoparticles.

(2) Dissolution Removal of Template

The alumina nanoparticles (that is, the template) are removed from the carbon-coated alumina nanoparticles obtained in (1) above.

Hydrogen fluoride (HF) is used to remove the template from the carbon-coated alumina nanoparticles. The carbon-coated alumina nanoparticles and an HF aqueous solution having a concentration of 46% by mass are placed in a beaker made of Teflon (registered trademark), and the mixture is held at room temperature for 6 hours while stirring the mixture with a stirrer made of Teflon (registered trademark). Thereafter, the mixture is naturally cooled. The sample is collected by filtration and dried by vacuum heating and drying at 150° C. for 6 hours to obtain a porous carbon material. The porous carbon material obtained at this stage is referred to as a carbon mesosponge (CMS).

(3) Heat Treatment of Porous Carbon Material

The porous carbon material obtained in (2) above is pulverized, several pieces are collected, placed in a container made of graphite, and set in a high-temperature furnace. The high temperature portion is depressurized to 10 Pa with an oil pump, and a heat treatment is performed while flowing a small amount of Ar to obtain a porous carbon material (1).

As a heat treatment condition, a temperature is first raised from room temperature to 1,800° C. over 120 minutes. Moreover, a heat treatment is performed at 1,800° C. for 60 minutes and then natural cooling is performed to room temperature. The porous carbon material (1) obtained as above is a graphene mesosponge (GMS) in which hydrogen termination edges of the CMS are fused by heat treatment at a high temperature of 1,800° C. to form a more highly continuous three-dimensional graphene skeleton.

Manufacturing of Porous Carbon Material (2)

A porous carbon material (2) is obtained in the same manner as in the porous carbon material (1) except that the temperature of the CVD treatment is changed from 900° C. to 650° C.

Manufacturing of Porous Carbon Material (3)

A porous carbon material (3) is obtained in the same manner as in the porous carbon material (1) except that the temperature of the CVD treatment is changed from 900° C. to 600° C.

Manufacturing of Porous Carbon Material (4)

A porous carbon material (4) is obtained in the same manner as in the porous carbon material (1) except that the time for the CVD treatment is changed from 2 hours to 1.5 hours.

Manufacturing of Porous Carbon Material (5)

A porous carbon material (5) is obtained in the same manner as in the porous carbon material (1) except that the time for the CVD treatment is changed from 2 hours to 1 hour.

Manufacturing of Porous Carbon Material (6)

A porous carbon material (6) is obtained in the same manner as in the porous carbon material (1) except that the temperature of the CVD treatment is changed from 900° C. to 1,000° C.

Manufacturing of Porous Carbon Material (7)

A porous carbon material (7) is obtained in the same manner as in the porous carbon material (1) except that the temperature of the CVD treatment is changed from 900° C. to 950° C.

Manufacturing of Porous Carbon Material (8)

A porous carbon material (8) is obtained in the same manner as in the porous carbon material (1) except that the temperature of the CVD treatment is changed from 900° C. to 850° C.

Manufacturing of Porous Carbon Material (9)

A porous carbon material (9) is obtained in the same manner as in the porous carbon material (1) except that the temperature of the CVD treatment is changed from 900° C. to 800° C.

Manufacturing of Porous Carbon Material (10)

A porous carbon material (10) is obtained in the same manner as in the porous carbon material (1) except that the pulverizing time during the heat treatment is set to 0.5 times.

Manufacturing of Porous Carbon Material (11)

A porous carbon material (11) is obtained in the same manner as in the porous carbon material (1) except that the pulverizing time during the heat treatment is set to 0.6 times.

Manufacturing of Porous Carbon Material (12)

A porous carbon material (12) is obtained in the same manner as in the porous carbon material (1) except that the pulverizing time during the heat treatment is set to 2.5 times.

Manufacturing of Porous Carbon Material (13)

A porous carbon material (13) is obtained in the same manner as in the porous carbon material (1) except that the pulverizing time during the heat treatment is set to 3 times.

Manufacturing of Porous Carbon Material (14)

A porous carbon material (14) is obtained in the same manner as in the porous carbon material (1) except that the average particle size of the alumina nanoparticles is set to 1 μm.

Manufacturing of Porous Carbon Material (15)

A porous carbon material (15) is obtained in the same manner as in the porous carbon material (1) except that the average particle size of the alumina nanoparticles is set to 0.9 μm.

Manufacturing of Porous Carbon Material (16)

A porous carbon material (16) is obtained in the same manner as in the porous carbon material (1) except that the average particle size of the alumina nanoparticles is set to 4 nm.

Manufacturing of Porous Carbon Material (17)

A porous carbon material (17) is obtained in the same manner as in the porous carbon material (1) except that the average particle size of the alumina nanoparticles is set to 2 nm.

Manufacturing of Porous Carbon Material (18)

A porous carbon material (18) is obtained in the same manner as in the porous carbon material (1) except that the alumina nanoparticles and the quartz sand as a spacer are mixed at a weight ratio of 5:10 (alumina nanoparticles: quartz sand).

Manufacturing of Porous Carbon Material (19)

A porous carbon material (19) is obtained in the same manner as in the porous carbon material (1) except that the alumina nanoparticles and the quartz sand as a spacer are mixed at a weight ratio of 4.5:10 (alumina nanoparticles: quartz sand).

Manufacturing of Porous Carbon Material (20)

A porous carbon material (20) is obtained in the same manner as in the porous carbon material (1) except that the alumina nanoparticles and the quartz sand as a spacer are mixed at a weight ratio of 2:10 (alumina nanoparticles: quartz sand).

Manufacturing of Porous Carbon Material (21)

A porous carbon material (21) is obtained in the same manner as in the porous carbon material (1) except that the alumina nanoparticles and the quartz sand as a spacer are mixed at a weight ratio of 1.8:10 (alumina nanoparticles: quartz sand).

Manufacturing of Comparative Porous Carbon Material (C1)

As the carbon material, Denka Black (porous carbon material (C1)) manufactured by Denka Company Limited is used. The Denka Black is used as the carbon material (C1).

Manufacturing of Comparative Porous Carbon Material (C2)

A porous carbon material (C2) is obtained in the same manner as in the porous carbon material (1) except that the temperature of the CVD treatment in Example 1 is changed from 900° C. to 500° C.

Manufacturing of Comparative Porous Carbon Material (C3)

A porous carbon material (C3) is obtained in the same manner as in the porous carbon material (1) except that the temperature of the CVD treatment in Example 1 is changed from 900° C. to 700° C.

Manufacturing of Comparative Porous Carbon Material (C4)

A porous carbon material (C4) is obtained in the same manner as in the porous carbon material (1) except that the temperature of the CVD treatment is changed from 900° C. to 700° C. and the time is changed from 2 hours to 3 hours.

Example 1

A porous carbon material (1) as the carbon material is mixed with a silicone rubber stock solution (X-34-1053 manufactured by Shin-Etsu Chemical Co., Ltd., solid content concentration: 60% by mass, solvent: butyl acetate) as the polymer material to obtain a composition for forming a molded product.

A mixing amount of the polymer material and the carbon material is set to an amount that would be a content (=% by volume) with respect to the obtained molded product.

The obtained composition for forming a molded product is applied onto the base material made of polyimide to form a coating film, and the coating film is heated at 100° C. for 30 minutes to form a layered molded product having a film thickness of 450 μm.

Examples 2 to 33 and Comparative Examples 1 to 3

A layered molded product is obtained in the same manner as in Example 1 except that types and amounts of the polymer material and the carbon material are changed according to Table 1.

Evaluation

Each physical property of the obtained molded product is measured by the method described above. The physical properties of the porous carbon material are also shown in Table 1.

Details such as abbreviations in the column of Table 1 are as follows.

W (002): Half width of the peak derived from the (002) plane of carbon in the X-ray diffraction spectrum (a case where the column in the table is shaded shows that the half width of the peak derived from the (002) plane of carbon is not observed)

W (10): Half width of the peak derived from the (10) plane of carbon in the X-ray diffraction spectrum Peak intensity (G'): Peak intensity (G') of the G' band measured near 2,670 $cm^{-1}$ by Raman spectroscopy Peak intensity (G): Peak intensity (G) of the G band measured near 1,590 $cm^{-1}$ by Raman spectroscopy.

CNT (1): Long carbon nanotube (manufactured by High Pressure Gas Industry Co., Ltd., average length=5.0 μm, average diameter=10 nm CNT (2): Short carbon nanotube (manufactured by High Pressure Gas Industry Co., Ltd., average length=3.0 μm, average diameter=10 nm CB: Denka Black (manufactured by Denka Company Limited, average secondary particle size=200 μm)

Si rubber: Silicone rubber (stock solution=X-34-1053 manufactured by Shin-Etsu Chemical Co., Ltd., solid content concentration: 60% by mass, solvent: butyl acetate)

Conductive resin: Polythiophene ("SEPLEGYDA" manufactured by Shin-Etsu Polymer Co., Ltd.)

In the column of Volume resistivity, "$n_1 * n_2 \char`^ n_3$" ($n_1$ to $n_3$ are all numerical values) indicates "$n_1 \times n_2^{n_3}$"

TABLE 1

| | | Carbon material Porous carbon material (Graphene mesosponge) | | | | | | | | | |
|---|---|---|---|---|---|---|---|---|---|---|---|
| | Kind | Content (% by volume) | W (002) (°) | W (10) (°) | Peak intensity (G') | Peak intensity (G) | Ratio (G'/G) | BET specific surface area ($m^2$/g) | Average secondary particle size (nm) | Average primary particle size (nm) | Porosity (% by volume) |
| Example 1 | 1 | 5.0 | 6.0 | 3.0 | 145.5 | 150.0 | 0.970 | 1800.0 | 100.0 | 5.0 | 70.0 |
| Example 2 | 1 | 11.0 | 6.0 | 3.0 | 145.5 | 150.0 | 0.970 | 1800.0 | 100.0 | 5.0 | 70.0 |
| Example 3 | 1 | 9.5 | 6.0 | 3.0 | 145.5 | 150.0 | 0.970 | 1800.0 | 100.0 | 5.0 | 70.0 |
| Example 4 | 1 | 2.5 | 6.0 | 3.0 | 145.5 | 150.0 | 0.970 | 1800.0 | 100.0 | 5.0 | 70.0 |
| Example 5 | 1 | 1.0 | 6.0 | 3.0 | 145.5 | 150.0 | 0.970 | 1800.0 | 100.0 | 5.0 | 70.0 |
| Example 6 | 1 | 5.0 | 6.0 | 3.0 | 145.5 | 150.0 | 0.970 | 1800.0 | 100.0 | 5.0 | 70.0 |
| Example 7 | 1 | 5.0 | 6.0 | 3.0 | 145.5 | 150.0 | 0.970 | 1800.0 | 100.0 | 5.0 | 70.0 |
| Example 8 | 1 | 5.0 | 6.0 | 3.0 | 145.5 | 150.0 | 0.970 | 1800.0 | 100.0 | 5.0 | 70.0 |
| Example 9 | 1 | 5.0 | 6.0 | 3.0 | 145.5 | 150.0 | 0.970 | 1800.0 | 100.0 | 5.0 | 70.0 |
| Example 10 | 1 | 5.0 | 6.0 | 3.0 | 145.5 | 150.0 | 0.970 | 1800.0 | 100.0 | 5.0 | 70.0 |
| Example 11 | 1 | 5.0 | 6.0 | 3.0 | 145.5 | 150.0 | 0.970 | 1800.0 | 100.0 | 5.0 | 70.0 |
| Example 12 | 1 | 5.0 | 6.0 | 3.0 | 145.5 | 150.0 | 0.970 | 1800.0 | 100.0 | 5.0 | 70.0 |
| Example 13 | 2 | 5.0 | 5.5 | 1.2 | 90.0 | 120.0 | 0.750 | 1600.0 | 95.0 | 4.5 | 60.0 |
| Example 14 | 3 | 5.0 | | 1.0 | 90.0 | 120.0 | 0.750 | 1600.0 | 95.0 | 4.5 | 60.0 |
| Example 15 | 4 | 5.0 | 5.7 | 1.5 | 66.0 | 110.0 | 0.600 | 1500.0 | 90.0 | 3.8 | 62.0 |
| Example 16 | 5 | 5.0 | 5.7 | 1.5 | 62.7 | 110.0 | 0.570 | 1500.0 | 90.0 | 3.8 | 62.0 |

TABLE 1-continued

| | | | | | | | | | | | |
|---|---|---|---|---|---|---|---|---|---|---|---|
| Example 17 | 6 | 5.0 | 5.5 | 1.4 | 220.0 | 200.0 | 1.100 | 2700.0 | 95.0 | 4.9 | 65.0 |
| Example 18 | 7 | 5.0 | 5.5 | 1.4 | 220.0 | 200.0 | 1.100 | 2600.0 | 95.0 | 4.9 | 65.0 |
| Example 19 | 8 | 5.0 | 7.0 | 2.5 | 200.0 | 250.0 | 0.800 | 800.0 | 95.0 | 4.8 | 65.0 |
| Example 20 | 9 | 5.0 | 7.0 | 2.5 | 200.0 | 250.0 | 0.800 | 750.0 | 95.0 | 4.8 | 65.0 |
| Example 21 | 10 | 5.0 | 6.3 | 3.0 | 155.2 | 160.0 | 0.970 | 1800.0 | 11000.0 | 5.0 | 68.0 |
| Example 22 | 11 | 5.0 | 6.3 | 2.9 | 150.4 | 155.0 | 0.970 | 1750.0 | 9900.0 | 4.9 | 67.0 |
| Example 23 | 12 | 5.0 | 6.3 | 3.0 | 155.2 | 160.0 | 0.970 | 1800.0 | 5.2 | 5.0 | 68.0 |
| Example 24 | 13 | 5.0 | 6.3 | 2.9 | 150.4 | 155.0 | 0.970 | 1750.0 | 4.8 | 4.9 | 67.0 |
| Example 25 | 14 | 5.0 | 6.2 | 2.9 | 143.5 | 151.0 | 0.950 | 1850.0 | 8800.0 | 1100.0 | 66.0 |
| Example 26 | 15 | 5.0 | 6.4 | 3.1 | 150.4 | 155.0 | 0.970 | 1820.0 | 7700.0 | 950.0 | 68.0 |
| Example 27 | 16 | 5.0 | 6.2 | 2.9 | 143.5 | 151.0 | 0.950 | 1850.0 | 44.0 | 1.1 | 66.0 |
| Example 28 | 17 | 5.0 | 6.4 | 3.1 | 150.4 | 155.0 | 0.970 | 1820.0 | 20.0 | 0.8 | 68.0 |
| Example 29 | 18 | 5.0 | 6.1 | 3.0 | 145.5 | 150.0 | 0.970 | 1800.0 | 100.0 | 5.0 | 92.0 |
| Example 30 | 19 | 5.0 | 6.0 | 3.0 | 145.5 | 150.0 | 0.970 | 1800.0 | 100.0 | 5.0 | 89.0 |
| Example 31 | 20 | 5.0 | 6.1 | 3.0 | 145.5 | 150.0 | 0.970 | 1800.0 | 100.0 | 5.0 | 31.0 |
| Example 32 | 21 | 5.0 | 6.0 | 3.0 | 145.5 | 150.0 | 0.970 | 1800.0 | 100.0 | 5.0 | 28.0 |
| Example 33 | C2 | 5 | Not observed | 3.0 | 140.6 | 148 | 0.950 | 1810 | 100 | 5 | 70 |
| Comparative Example 1 | — | — | — | — | — | — | — | — | — | — | — |
| Comparative Example 2 | C3 | 5 | 3.5 | 3.0 | 141.55 | 149 | 0.950 | 1810 | 100 | 5 | 70 |
| Comparative Example 3 | C4 | 5 | 3.1 | 4.1 | 139.65 | 147 | 0.950 | 1810 | 100 | 5 | 70 |

| | Carbon material | | | | | Polymer material | | Evaluation | | | |
|---|---|---|---|---|---|---|---|---|---|---|---|---|
| | CNT | | | | CB | | Si | Conductive | | | | |
| | Kind | Content (% by volume) | Average length (μm) | Kind | Content (% by volume) | rubber (% by volume) | resin (% by volume) | Thermal conductivity W/m·K | ASKER A hardness | Young's modulus MPa | Volume resistivity (Ωcm) |
| Example 1 | — | — | — | — | — | 95.0 | — | 2.70 | 20.0 | 0.60 | $1.55 \times 10^3$ |
| Example 2 | — | — | — | — | — | 89.0 | — | 5.20 | 35.6 | 1.10 | $1.55 \times 10^2$ |
| Example 3 | — | — | — | — | — | 90.0 | — | 4.90 | 31.0 | 1.00 | $1.05 \times 10^2$ |
| Example 4 | — | — | — | — | — | 97.5 | — | 1.60 | 11.0 | 0.21 | $1.65 \times 10^3$ |
| Example 5 | — | — | — | — | — | 99.0 | — | 1.30 | 9.5 | 0.19 | $1.55 \times 10^4$ |
| Example 6 | — | — | — | — | — | — | 95.0 | 3.50 | 25.0 | 0.80 | $5.85 \times 10^2$ |
| Example 7 | 1 | 0.5 | 5.0 | — | — | 94.5 | — | 2.73 | 20.5 | 0.62 | $1.45 \times 10^3$ |
| Example 8 | 1 | 2.0 | 5.0 | — | — | 93.0 | — | 2.88 | 21.3 | 0.65 | $5.05 \times 10^2$ |
| Example 9 | 1 | 3.0 | 5.0 | — | — | 92.0 | — | 3.05 | 23.0 | 0.72 | $4.50 \times 10^2$ |
| Example 10 | 1 | 1.0 | 5.0 | — | — | 94.0 | — | 2.80 | 20.5 | 0.61 | $5.51 \times 10^3$ |
| Example 11 | 1 | 4.0 | 5.0 | — | — | 91.0 | — | 3.17 | 24.5 | 0.74 | $1.45 \times 10^2$ |
| Example 12 | 2 | 2.0 | 3.0 | — | — | 93.0 | — | 2.71 | 20.2 | 0.61 | $5.25 \times 10^3$ |
| Example 13 | — | — | — | — | — | 95.0 | — | 2.65 | 20.5 | 0.61 | $1.70 \times 10^3$ |
| Example 14 | — | — | — | — | — | 95.0 | — | 2.60 | 21.0 | 0.62 | $1.73 \times 10^3$ |
| Example 15 | — | — | — | — | — | 95.0 | — | 2.55 | 21.2 | 0.64 | $1.75 \times 10^3$ |
| Example 16 | — | — | — | — | — | 95.0 | — | 2.52 | 21.4 | 0.66 | $1.76 \times 10^3$ |
| Example 17 | — | — | — | — | — | 95.0 | — | 3.11 | 19.1 | 0.55 | $1.40 \times 10^3$ |
| Example 18 | — | — | — | — | — | 95.0 | — | 3.05 | 19.5 | 0.51 | $1.45 \times 10^3$ |
| Example 19 | — | — | — | — | — | 95.0 | — | 2.65 | 20.5 | 0.64 | $1.61 \times 10^3$ |
| Example 20 | — | — | — | — | — | 95.0 | — | 2.60 | 20.9 | 0.67 | $1.66 \times 10^3$ |
| Example 21 | — | — | — | — | — | 95.0 | — | 2.66 | 28.5 | 0.95 | $5.04 \times 10^2$ |
| Example 22 | — | — | — | — | — | 95.0 | — | 2.67 | 26.5 | 0.90 | $4.64 \times 10^2$ |
| Example 23 | — | — | — | — | — | 95.0 | — | 2.68 | 22.3 | 0.70 | $1.33 \times 10^3$ |
| Example 24 | — | — | — | — | — | 95.0 | — | 2.71 | 21.5 | 0.65 | $2.22 \times 10^3$ |
| Example 25 | — | — | — | — | — | 95.0 | — | 2.88 | 24.0 | 0.80 | $1.01 \times 10^3$ |
| Example 26 | — | — | — | — | — | 95.0 | — | 2.66 | 23.0 | 0.70 | $6.1 \times 10^3$ |
| Example 27 | — | — | — | — | — | 95.0 | — | 2.22 | 21.0 | 0.64 | $8.1 \times 10^3$ |
| Example 28 | — | — | — | — | — | 95.0 | — | 2.10 | 20.0 | 0.62 | $9.9 \times 10^3$ |
| Example 29 | — | — | — | — | — | 95.0 | — | 2.65 | 24.0 | 0.80 | $1.01 \times 10^3$ |
| Example 30 | — | — | — | — | — | 95.0 | — | 2.63 | 23.0 | 0.70 | $6.1 \times 10^3$ |
| Example 31 | — | — | — | — | — | 95.0 | — | 2.61 | 21.0 | 0.64 | $8.1 \times 10^3$ |
| Example 32 | — | — | — | — | — | 95.0 | — | 2.57 | 20.5 | 0.62 | $9.9 \times 10^3$ |
| Example 33 | — | — | — | — | — | 95.0 | — | 2.55 | 22.5 | 0.75 | $5.0 \times 10^3$ |
| Comparative Example 1 | — | — | — | C1 | 5.0 | 95.0 | — | 1.00 | 40.0 | 1.50 | $2.5 \times 10^4$ |
| Comparative Example 3 | — | — | — | — | — | 95.0 | — | 0.98 | 22.3 | 0.72 | $6 \times 10^4$ |
| Comparative Example 4 | — | — | — | — | — | 95.0 | — | 0.97 | 22.1 | 0.74 | $6.2 \times 10^4$ |

From the above results, it can be seen that the molded product of the present examples has a higher thermal conduction property and a higher flexibility comparing to the molded product of the comparative examples.

As a result, it can be seen that in a case where the molded product of the present example is applied to the elastic layer of the fixing member, it is possible to shorten the warm-up time, suppress the fixing unevenness, and improve the followability to a recording medium having large irregularities.

In addition, it can be seen that the molded product of the present example has a high thermal conduction property and a high flexibility, and also has appropriate conductivity, so that the molded product is used in the artificial muscle, the pressure sensor, the tactile sensor, and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. the exemplary embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polymer material molded product comprising:
   a polymer material; and
   a porous carbon material, wherein the porous carbon material is graphene mesosponge, and a porosity of the graphene mesosponge is 50% by volume or more and 80% by volume or less, and the porous carbon material has an X-ray diffraction spectral characteristic shown in the following (1) or (2),
   (1): a peak derived from a (002) plane of carbon is observed, a half width of the peak derived from the (002) plane of carbon is 5° or more, and a half width of a peak derived from a (10) plane of carbon is 3.2° or less, and
   (2): the peak derived from the (002) plane of carbon is not observed, and the half width of the peak derived from the (10) plane of carbon is 3.2° or less.

2. The polymer material molded product according to claim 1,
   wherein the half width of the peak derived from the (10) plane of carbon is 1.2° or more and 3.2° or less.

3. The polymer material molded product according to claim 2,
   wherein the porous carbon material has a Raman spectroscopic characteristic shown in the following (3),
   (3): a ratio (G'/G) of a peak intensity (G') of a G' band measured near 2,670 $cm^{-1}$ and a peak intensity (G) of a G band measured near 1,590 $cm^{-1}$ by a Raman spectroscopy is 0.6 or more.

4. The polymer material molded product according to claim 2,
   wherein the porous carbon material has a BET specific surface area of 800 $m^2/g$ or more and 2,600 $m^2/g$ or less.

5. The polymer material molded product according to claim 1,
   wherein the porous carbon material has a Raman spectroscopic characteristic shown in the following (3),
   (3): a ratio (G'/G) of a peak intensity (G') of a G' band measured near 2,670 $cm^{-1}$ and a peak intensity (G) of a G band measured near 1,590 $cm^{-1}$ by a Raman spectroscopy is 0.6 or more.

6. The polymer material molded product according to claim 1,
   wherein the porous carbon material has a BET specific surface area of 800 $m^2/g$ or more and 2,600 $m^2/g$ or less.

7. The polymer material molded product according to claim 1,
   wherein an average secondary particle size of the porous carbon material is 5 nm or more and 10 µm or less.

8. The polymer material molded product according to claim 7,
   wherein an average primary particle size of the porous carbon material is 1 nm or more and 1 µm or less.

9. The polymer material molded product according to claim 1,
   wherein a content of the porous carbon material is 2% by volume or more and 10% by volume or less with respect to the polymer material molded product.

10. The polymer material molded product according to claim 1,
    wherein the polymer material is an elastic material.

11. The polymer material molded product according to claim 1, further comprising:
    carbon nanotubes.

12. The polymer material molded product according to claim 11,
    wherein the carbon nanotubes have an average length of 5 µm or more.

13. The polymer material molded product according to claim 11,
    wherein a content of the carbon nanotubes is 1% by volume or more and 3% by volume or less with respect to the polymer material molded product.

14. The polymer material molded product according to claim 11,
    wherein a content of the carbon nanotubes is 0.5% by volume or more and 4% by volume or less with respect to the polymer material molded product.

15. The polymer material molded product according to claim 1,
    wherein the polymer material molded product has a thermal conductivity of 1.5 W/m·K or more.

16. The polymer material molded product according to claim 15,
    wherein the polymer material molded product has a Young's modulus of 1.0 MPa or less.

17. A fixing member comprising:
    a base material; and
    an elastic layer provided on the base material and consisting of the polymer material molded product according to claim 1.

18. A fixing device comprising:
    a first rotating body; and
    a second rotating body arranged in contact with an outer surface of the first rotating body,
    wherein at least one of the first rotating body or the second rotating body is the fixing member according to claim 17.

19. An image forming apparatus comprising:
an image holder;
a charging device that charges a surface of the image holder;
a latent image forming device that forms a latent image on the charged surface of the image holder;
a developing device that develops the latent image by a toner to form a toner image;
a transfer device that transfers the toner image to a recording medium; and
the fixing device according to claim 18 that fixes the toner image to the recording medium.

20. A polymer material molded product comprising:
a polymer material; and
a porous carbon material, wherein the porous carbon material is graphene mesosponge, and a porosity of the graphene mesosponge is 50% by volume or more and 80% by volume or less,
wherein a thermal conductivity of the polymer material molded product is 1.5 W/m·K or more, and
a Young's modulus of the polymer material molded product is 1.0 MPa or less.

21. A polymer material molded product comprising:
a polymer material; and
a porous carbon material having an X-ray diffraction spectral characteristic shown in the following (1) or (2),
(1): a peak derived from a (002) plane of carbon is observed, a half width of the peak derived from the (002) plane of carbon is 5° or more, and a half width of a peak derived from a (10) plane of carbon is 3.2° or less, and
(2): the peak derived from the (002) plane of carbon is not observed, and the half width of the peak derived from the (10) plane of carbon is 3.2° or less; and
wherein the polymer material molded product further comprises carbon nanotubes, and wherein a content of the carbon nanotubes is 0.5% by volume or more and 4% by volume or less with respect to the polymer material molded product.

22. The polymer material molded product according to claim 21,
wherein a content of the carbon nanotubes is 1% by volume or more and 3% by volume or less with respect to the polymer material molded product.

* * * * *